United States Patent
Verduyckt et al.

(10) Patent No.: US 12,454,508 B2
(45) Date of Patent: Oct. 28, 2025

(54) PROCESS FOR THE RECOVERY OF EPSILON-CAPROLACTAM FROM POLYAMIDE 6 COMPRISING FISHING NETS

(71) Applicant: CAP III B.V., Urmond (NL)

(72) Inventors: Jasper Verduyckt, Urmond (NL); Peter Roos, Urmond (NL); Kate Emily Murphy, Urmond (NL); Henricus Anna Christiaan Baur, Urmond (NL); Wenjing Fu, Urmond (NL); Johan Thomas Tinge, Urmond (NL)

(73) Assignee: CAP III B.V., Urmond (NL)

( * ) Notice: Subject to any disclaimer, the term of this patent is extended or adjusted under 35 U.S.C. 154(b) by 0 days.

(21) Appl. No.: 18/832,305

(22) PCT Filed: Jan. 27, 2023

(86) PCT No.: PCT/EP2023/052069
§ 371 (c)(1),
(2) Date: Jul. 23, 2024

(87) PCT Pub. No.: WO2023/144338
PCT Pub. Date: Aug. 3, 2023

(65) Prior Publication Data
US 2025/0136547 A1    May 1, 2025

(30) Foreign Application Priority Data

Jan. 28, 2022 (EP) .................................. 22154098
Nov. 21, 2022 (EP) .................................. 22208659

(51) Int. Cl.
| C07D 201/12 | (2006.01) |
| B09B 3/40 | (2022.01) |
| B09B 3/70 | (2022.01) |
| B09B 3/80 | (2022.01) |
| C07D 201/16 | (2006.01) |
| C07D 223/10 | (2006.01) |
| B09B 101/75 | (2022.01) |

(52) U.S. Cl.
CPC .............. C07D 201/16 (2013.01); B09B 3/40 (2022.01); B09B 3/70 (2022.01); B09B 3/80 (2022.01); B09B 2101/75 (2022.01)

(58) Field of Classification Search
CPC ... C07D 201/12; C07D 201/16; C07D 223/10
See application file for complete search history.

(56) References Cited

U.S. PATENT DOCUMENTS

| 5,169,870 A | 12/1992 | Corbin et al. |
| 5,233,037 A | 8/1993 | Nielinger et al. |
| 5,700,358 A | 12/1997 | Fuchs et al. |
| 5,869,654 A | 2/1999 | Sifniades et al. |
| 5,929,234 A | 7/1999 | Sifniades et al. |
| 5,948,908 A | 9/1999 | Sifniades et al. |
| 5,977,193 A | 11/1999 | Corbin et al. |
| 5,990,306 A | 11/1999 | Mayer et al. |
| 6,448,395 B1 | 9/2002 | Simons et al. |
| 2002/0038022 A1 | 3/2002 | Agterberg et al. |
| 2014/0255255 A1 | 9/2014 | Heilberg |
| 2024/0092991 A1 | 3/2024 | Titcomb et al. |

FOREIGN PATENT DOCUMENTS

| CN | 1196048 A | 10/1998 |
| CN | 1278792 A | 1/2001 |
| CN | 1332158 A | 1/2002 |
| CN | 1793124 A | 6/2006 |
| CN | 103467378 A | 12/2013 |
| CN | 107418198 A | 12/2017 |
| CN | 116261581 A | 6/2023 |
| DE | 4211609 A1 | 3/1993 |
| DE | 10048824 A1 | 4/2002 |
| EP | 603434 A1 | 6/1994 |
| EP | 670 308 A1 | 9/1995 |
| EP | 0627417 B1 | 8/1999 |
| EP | 1 173 419 A1 | 1/2002 |
| GB | 1157416 A | 7/1969 |
| GB | 2085432 A | 4/1982 |
| JP | H0848666 A | 2/1996 |
| JP | H10298162 A | 11/1998 |
| JP | 2000038471 A | 2/2000 |
| JP | 2000178249 A | 6/2000 |
| JP | 2001294571 A | 10/2001 |
| JP | 2007009645 A | 1/2007 |
| JP | 2007099645 A | 4/2007 |
| JP | 2008031127 A | 2/2008 |

(Continued)

OTHER PUBLICATIONS

International Search Report and Written Opinion issued in related PCT Application No. PCT/EP2023/069235, dated Aug. 7, 2023.
Gong Caihong et al: "Simple process for separation and recycling of nylon 6 and polyurethane components from waste nylon 6/polyurethane debris", Textile Research Journal, vol. 91, No. 1-2 Jun. 17, 2020 (Jun. 17, 2020), pp. 18-27, XP093006676, GB ISSN: 0040-5175, DOI: 10.1177/0040517520931893 Retrieved from the Internet: URL:http://journals.sagepub.com/doi/full-x ml/10.1177/0040517520931893 Title, Abstract, Scheme 1, p. 19, right, lines 11-13 and lines 17-18, Figure 4 (IR) for nylon and Figure 6 (NMR) for the urethane, p. 23, right, lines 37-39.
Yin Yunjie et al: "Removal of spandex from nylon/spandex blended fabrics by selective polymer degradation", Textile Research Journal vol. 84, No. 1 May 21, 2013 (May 21, 2013), pp. 16-27, XP093006635, GB ISSN: 0040-5175, DOI:10.1177/0040517513487790 Retrieved from the Internet: URL:http://journals.sagepub.com/doi/full-xml/10.1177/0040517513487790p17, left, lines 14-18.

(Continued)

*Primary Examiner* — Bruck Kifle
(74) *Attorney, Agent, or Firm* — Honigman LLP

(57) ABSTRACT

The present invention provides a process and a plant for recovering purified ε-caprolactam from polyamide 6 comprising fishing nets, wherein the plant comprises a depolymerization section [B], a recovery section [C], and a purification section [D], The present invention also provides purified e-caprolactam that has a particularly low product carbon footprint and is obtained via depolymerization of polyamide 6 from fishing nets.

14 Claims, 4 Drawing Sheets

(56) References Cited

FOREIGN PATENT DOCUMENTS

| | | | |
|---|---|---|---|
| JP | 2008031128 A | 2/2008 | |
| JP | 2008031388 A | 2/2008 | |
| JP | 2008179816 A | 8/2008 | |
| JP | 2008239985 A | 10/2008 | |
| JP | 2011088943 A | 5/2011 | |
| KR | 20110068001 A | 6/2011 | |
| WO | 97/03048 A1 | 1/1997 | |
| WO | 9720813 A1 | 6/1997 | |
| WO | 9911616 A1 | 3/1999 | |
| WO | 2021021031 A1 | 2/2021 | |
| WO | 2022/115602 A1 | 6/2022 | |
| WO | 2022/129022 A1 | 6/2022 | |

OTHER PUBLICATIONS

International Search Report and Written Opinion issued in related PCT Application No. PCT/EP2023/069236, dated Sep. 12, 2023.
KPO. Office Action relating to application No. 2024-7028713, dated Dec. 12, 2024.
International Search Report and Written Opinion issued in related PCT Application No. PCT/EP2023/052067, dated Apr. 11, 2023.
Tinge et al. (2018). Caprolactam. In Ullmann's Encyclopedia of Industrial Chemistry. May 25, 2018. https://doi.org/10.1002/14356007.a05_031.pub3.
Herzog et al. (2013). Polyamides. In Ullmann's Encyclopedia of Industrial Chemistry, (Ed.). Jan. 15, 2013. https://doi.org/10.1002/14356007.a21_179.pub3.
Dmitrieva et al., "Regeneration of Epsilon-Caprolactam From Wastes In the Manufacture of Polycaproamide Fibres and Yarns", Fibre Chemistry, pp. 229-241, Mar. 1986, (translated from Khimicheskie Volokna, No. 4, pp. 5-12, Jul.-Aug. 1985).
A. A. Ogale, "Depolymerization of Nylon 6: Some Kinetic Modeling Aspects", Journal of Applied Polymer Science, vol. 29, 1984, pp. 3947-3954, https://doi.org/10.1002/app.1984.070291227.
Synowiec et al. "Industrial Purification of Caprolactam by Means of Crystallization from Aqueous Solutions", Crystal Research and Technology, vol. 18, noi. 7, Jan. 1, 1983 (Jan. 1, 1983), pp. 951-957.
International Search Report and Written Opinion issued in related PCT Application No. PCT/EP2023/052071, dated May 4, 2023.
International Search Report and Written Opinion issued in related PCT Application No. PCT/EP2023/052069, dated Apr. 11, 2023.
U.S. Appl. No. 18/832,297, filed Jul. 23, 2024, Jasper Verduyckt et al.
U.S. Appl. No. 18/832,315, filed Jul. 23, 2024, Jasper Verduyckt et al.
Office Action issued in related Chinese Application No. 202380019033.8, dated Mar. 3, 2025.
Office Action issued in related Chinese Patent Application No. 202380019025.3, dated May 20, 2025.

PROCESS FOR THE RECOVERY OF EPSILON-CAPROLACTAM FROM POLYAMIDE 6 COMPRISING FISHING NETS

CROSS-REFERENCE TO RELATED APPLICATIONS

This application is a national phase entry of PCT Application No. PCT/EP2023/052069 filed Jan. 27, 2023, which claims the benefit under 35 U.S.C. § 119(e) to European Patent Application Nos. EP 22154098.2, filed Jan. 28, 2022, and EP 22208659.7, filed on Nov. 21, 2022. The disclosures of those priority applications are incorporated by reference herein in their entireties.

TECHNICAL FIELD OF THE INVENTION

The present invention relates to a process for the recovery of epsilon-caprolactam from polyamide 6 comprising wasted fishing nets. More particularly, the present invention relates to a process for the recovery of epsilon-caprolactam from polyamide 6 comprising wasted fishing nets, whereby high quality epsilon-caprolactam is obtained.

BACKGROUND OF THE INVENTION

Fishing nets are nets used for fishing. Nets are devices made from fibers woven in a grid-like structure. Fishing nets are usually meshes formed by knotting a relatively thin thread. Modern nets are usually made of man-made fibers (such as polyamide 6, polyamide 6,6, polyester, polypropylene, and polyethylene).

Fishing nets can be left or lost in the seas and oceans by fishermen. Known as ghost nets, these nets cause major problems for fish and other animals. In general, the (bio-) degradation rates of fishing nets made of man-made fibers are often very low. These nets will therefore remain in the marine ecosystem for many years resulting in accumulation of huge quantities of ghost nets.

The latest estimates by FAO and the United Nations Environment Programme (UNEP) suggest that abandoned, lost and discarded fishing gear amounts roughly 640 million kilograms annually.

In recent years many initiatives were started to prevent ghost gear from entering the environment, like collecting discarded fishing nets in harbors, and even removing them from the sea bottom with the assistance of volunteer divers.

The fate of the collected wasted fishing nets, including polyamide 6 comprising fishing nets, ranges from landfilling, incineration (optionally with recovery of heat), re-granulation and compounding to depolymerization. Re-granulation and compounding are recycling processes in which wasted plastic is melted (and optionally subsequently filtered to remove solid impurities) and then converted into extrudates or directly injected into a mold. Depolymerization is a technology in which the polymer is converted into its monomer components (epsilon-caprolactam in case the polymer is polyamide 6).

Mechanical recycling (a.k.a. material recycling or back-to-plastics recycling) refers to operations that aim to recover plastics via mechanical processes (grinding, washing, separating, drying, re-granulating and compounding), thus producing recyclates that can be converted into plastics products, substituting virgin plastics. Currently, most virgin plastics are produced from a petrochemical feedstock, such as natural gas, coal or crude oil, which has never been used or processed before. In mechanical recycling processes, the polymer chain remains more or less intact. Mechanical recycling is a form of downcycling of the waste because the recycled material is of lower quality and functionality than the original material.

Depolymerization or chemical recycling is a technology in which the polymer is converted into its monomer components. The specifications of the recovered monomer determines whether it can substitute virgin monomers for all or just a limited amount of applications. Virgin monomers are produced from a petrochemical feedstock, such as natural gas, coal or crude oil, which has never been used or processed before.

In 1938, Paul Schlack invented polyamide 6 (CAS Number: 25038-54-4), also known as nylon 6, poly(caprolactam), poly(hexano-6-lactam), poly(6-aminohexanoic acid), poly(hexamethylene adipamide) or poly[imino(1-oxohexane-1,6-diyl)].

Generally, polyamide 6 (a.k.a. nylon 6 or polycaprolactam) is synthesized by ring-opening polymerization of epsilon-caprolactam at a temperature of about 260° C. in an inert atmosphere:

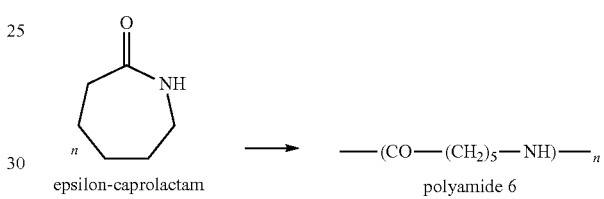

Processes for the production of virgin ε-caprolactam are described in, e.g., Chapter "Caprolactam", in Ullmann's Encyclopedia of Industrial Chemistry (May 25, 2018), Wiley-VCH Verlag GmbH & Co. KGaA, Weinheim, Germany, electronically available via https://doi.org/10.1002/14356007.a05_031.pub3.

Processes for the production of polyamide 6 are described in, e.g., Chapter "Polyamides", in Ullmann's Encyclopedia of Industrial Chemistry (Jan. 15, 2013), Wiley-VCH Verlag GmbH & Co. KGaA, Weinheim, Germany, electronically available via https://doi.org/10.1002/14356007.a21_179.pub3.

Depolymerization of polyamide 6 into epsilon-caprolactam is the reverse reaction of the ring-opening polymerization of epsilon-caprolactam:

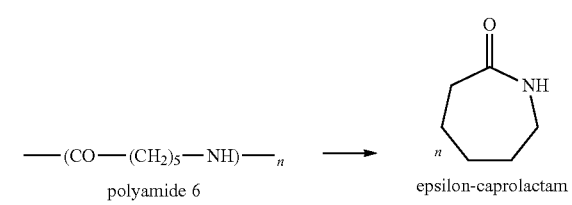

Processes for depolymerization of polyamide 6 are known. Such processes might be operated in a batch-wise operated mode, in a semi-continuous mode (in general with batch-wise (re)charging of polyamide 6 to the depolymerization reactor) or in a continuous mode.

L. A. Dmitrieva, A. A. Speranskii, S. A. Krasavin and Y. N. Bychkov, "Regeneration of epsilon-caprolactam From Wastes In the Manufacture of Polycaproamide Fibres and Yarns", Fibre Chemistry, pp. 229-241, March 1986, (translated from Khimicheskie Volokna, No. 4, pp. 5-12, July-August, 1985) is a literature review describing processes for depolymerizing polyamide 6 with and without using a catalyst.

A. A. Ogale, "Depolymerization of Nylon 6: Some Kinetic Modeling Aspects", Journal of Applied Polymer Science, vol. 29, 1984, pp. 3947-3954, electronically available via https://doi.org/10.1002/app.1984.070291227 is a paper describing the depolymerization kinetics of polyamide 6.

U.S. Pat. No. 5,929,234 describes a process for the recovery of epsilon-caprolactam from polycaprolactam-containing waste material. The depolymerization is performed in the absence of added catalyst with superheated steam at a temperature of about 250° C. to about 400° C. and at a pressure within the range of about 1 atm to about 100 atm and substantially less than the saturated vapor pressure of water at the temperature wherein a epsilon-caprolactam-containing vapor stream is formed.

Depolymerization of polyamide 6 comprising fishing nets has been practiced in the past. However, the quality of the obtained monomer epsilon-caprolactam by these processes has been particularly poor, despite a long history of polyamide 6 recycling. As a consequence, the epsilon-caprolactam obtained by the depolymerization of polyamide 6 comprising fishing nets is only applied for less demanding applications (downcycling), like engineering plastics and carpets. If epsilon-caprolactam obtained from depolymerization of fishing nets is used for more demanding applications, it needs to be blended with large quantities of higher and purer grades of epsilon-caprolactam in order to disguise the rather poor quality of the epsilon-caprolactam obtained from the depolymerization of fishing nets. High speed melt spinning of polyamide 6 for the production of thin textile fibers requires high quality epsilon-caprolactam as feed stock. High quality epsilon-caprolactam grades for these applications should not only be very pure, but also invariable over time in their properties.

Taken together, prior art processes for the recovery of epsilon-caprolactam from polyamide 6 comprising fishing nets are not able to produce high quality epsilon-caprolactam grades that can be used to replace virgin epsilon-caprolactam grades for high demanding applications.

Currently, no processes are available to recover high purity epsilon-caprolactam from polyamide 6 comprising fishing nets despite the urgent need for such processes. In particular, there is an urgent need for high purity epsilon-caprolactam recovery processes that can replace virgin epsilon-caprolactam grades for high demanding applications, like for high speed melt spinning during textile fiber production.

Further, there is a need for processes that allow the recovery of high purity epsilon-caprolactam from polyamide 6 comprising fishing nets in an economically reasonable manner. The production costs of the recovered high purity epsilon-caprolactam should be in the same ballpark or lower than the production costs of virgin high purity epsilon-caprolactam.

Furthermore there is a need to provide high purity grade epsilon-caprolactam from polyamide 6 comprising fishing nets that has a significantly lower carbon footprint than the epsilon-caprolactam produced by a process using virgin epsilon-caprolactam obtained via new synthesis, e.g., by Beckmann rearrangement of cyclohexanone oxime.

And there is a need for a plant for the production of high purity grade epsilon-caprolactam from material derived from polyamide 6 comprising fishing nets.

Finally, there is a need for processes that allow the recovery of epsilon-caprolactam from polyamide 6 comprising fishing nets on an industrial scale in order to process the huge amounts of polyamide 6 comprising fishing nets that are wasted annually.

SUMMARY OF THE INVENTION

It is an object of the present invention, to satisfy one or more of the above-described needs and to overcome the disadvantages associated with the prior art processes.

In particular, it is an object of the present invention to provide a process for recovering high purity epsilon-caprolactam from polyamide 6 comprising fishing nets. In this regard, it is a further object of the present invention to provide a process for recovering high purity epsilon-caprolactam from polyamide 6 comprising fishing nets that can replace high purity virgin epsilon-caprolactam for all applications including high speed melt spinning of polyamide 6 for the production of thin textile fibers.

It is a further object of the invention to provide a process for recovering high purity grade epsilon-caprolactam from polyamide 6 comprising fishing nets on an industrial scale.

It is also an object of the invention to provide a process for recovering high purity grade epsilon-caprolactam from polyamide 6 comprising fishing nets in an economically responsible manner. It is in particular an object of the present invention to provide a process that is suitable to recover high purity grade epsilon-caprolactam from polyamide 6 comprising fishing nets that does not exceed the production costs of virgin high purity epsilon-caprolactam.

It is a further object of the invention to provide high purity grade epsilon-caprolactam from polyamide 6 comprising fishing nets which is characterized by a significantly lower carbon footprint than the epsilon-caprolactam produced by a process using virgin epsilon-caprolactam obtained via new synthesis, e.g., by Beckmann rearrangement of cyclohexanone oxime.

The invention therefore also aims to provide a process that reduces the environmental burden of wasted polyamide 6 comprising fishing nets.

It is also an object of the invention to provide a plant for the production of high purity grade epsilon-caprolactam from material derived from polyamide 6 comprising fishing nets.

One or more further objects may become apparent from the remainder of the description.

All, several or at least one of the aforementioned objects are solved by the process of claim 1.

The present invention provides a process for recovering purified epsilon-caprolactam from material derived from polyamide 6 comprising fishing nets in a plant, wherein the plant comprises
 a depolymerization section [B],
 a recovery section [C], and
 a purification section [D],
 and wherein the process comprises the steps of.
 a) charging material derived from polyamide 6 comprising fishing nets to the depolymerization section [B];
 b) depolymerizing the material derived from polyamide 6 comprising fishing nets in the depolymerization section [B] at a temperature ranging from 180° C. to 400° C. so that an epsilon-caprolactam comprising stream is obtained;

c) discharging the epsilon-caprolactam comprising stream from the depolymerization section [B] and recovering crude epsilon-caprolactam from said stream in the recovery section [C]; and d) purifying said crude epsilon-caprolactam in the purification section [D] to obtain purified epsilon-caprolactam wherein the purification comprises the steps of
   (i) extracting the crude epsilon-caprolactam with an organic solvent, whereby an organic phase is obtained, and wherein the organic phase comprises the organic solvent, epsilon-caprolactam and impurities;
   (ii) switching the solvent by replacing the organic solvent at least partially with water, whereby an aqueous phase comprising water, epsilon-caprolactam and impurities with lower- or higher-boiling points than epsilon-caprolactam is obtained and wherein the solvent switch step (ii) is selected from a process based on back-extraction with water, and a process based on solvent swap distillation, in which the organic solvent is distilled off and water is charged; and
   (iii) obtaining purified epsilon-caprolactam by distillative removal of impurities with lower- or higher-boiling points than epsilon-caprolactam from said aqueous phase.

It was surprising that combining the special sequence of processing steps and process conditions according to the invention, i.e., the sequence of the above-defined depolymerization, recovery and purification steps, allows to recover high grade epsilon-caprolactam from material derived from polyamide 6 comprising fishing nets In high yields and in a straight-forward and economically reasonable manner. The process of the invention is economically reasonable and advantageous from several points of view. Firstly, the process of the invention is suitable for a large variety of material derived from polyamide 6 comprising fishing net materials that can, e.g., differ in their overall composition and/or in their polyamide 6-content. Secondly, the process of the invention allows to effectively separate epsilon-caprolactam from non-epsilon-caprolactam compounds so that high purity grade epsilon-caprolactam can be obtained that can replace high purity virgin epsilon-caprolactam for all applications including high speed melt spinning of polyamide 6 for the production of thin textile fibers. Thirdly, the process of the invention is so effective that epsilon-caprolactam can be obtained in high yields. Fourthly, the process of the invention allows the recovery of epsilon-caprolactam from polyamide 6 comprising fishing nets on an industrial scale in order to process the huge amounts of polyamide 6 comprising fishing nets that are currently wasted. Lastly, the process of the invention allows to produce epsilon-caprolactam with a significantly lower carbon footprint compared to epsilon-caprolactam produced by de novo synthesis of epsilon-caprolactam, e.g., by the Beckmann rearrangement of cyclohexanone oxime. The process of the invention allows to process material derived from polyamide 6 comprising fishing nets efficiently and to reduce the environmental burden of said products. In particular, the process of the invention allows the production of purified epsilon-caprolactam with a carbon footprint of less than 2 kg $CO_2$ equivalent per kg purified epsilon-caprolactam, which is a substantial improvement compared to the 6.5 to 7.5 kg $CO_2$ equivalent per kg epsilon-caprolactam associated with the production of "virgin" epsilon-caprolactam obtained from a Beckmann rearrangement of cyclohexanone oxime (based on data originating from ecoinvent version 3.7.1; location: Europe). Values for product carbon footprint stated herein are, unless otherwise stated, based on data originating from ecoinvent version 3.7.1 and Europe as location.

Next to the process of the invention, the present invention also provides a plant for the production of purified epsilon-caprolactam from polyamide 6 comprising fishing nets in a plant, wherein the plant comprises
a depolymerization section [B],
a recovery section [C],
a purification section [D], and
wherein the plant is configured for carrying out the process of the invention.

The present invention also provides purified epsilon-caprolactam obtained via depolymerization of polyamide 6 that is produced from polyamide 6 comprising fishing nets according to a process of the invention, wherein the epsilon-caprolactam has a product carbon footprint of less than 2 kg $CO_2$ equivalent per kg purified epsilon-caprolactam (based on data originating from ecoinvent version 3.7.1; location: Europe).

Advantageous embodiments of the invention are indicated in the dependent claims and are explained in more detail in the following.

DETAILED DESCRIPTION OF THE INVENTION

The Polyamide 6 Comprising Fishing Nets

The process of the invention uses polyamide 6 comprising fishing nets or material derived therefrom as starting material. A polyamide 6 comprising fishing net is typically a solid material, in particular polyamide 6 comprising fishing nets are usually meshes formed by knotting a relatively thin, polyamide 6 comprising thread. Material derived from polyamide 6 comprising fishing nets as used herein means material that is derived from polyamide 6 comprising fishing nets, e.g., after comminution, washing, sorting, compacting, pelletization and the like. Material derived from polyamide 6 comprising fishing nets as used herein includes also polyamide 6 comprising fishing nets that are not pre-treated e.g., by comminution, washing, sorting, compacting, pelletization and the like. The present disclosure uses the term "fishing nets" to also refer to "fishing net material(s)", i.e., these terms are used synonymously herein and can also be replaced by the term "material derived from polyamide 6 comprising fishing nets". As used in the present disclosure and claims, the singular forms "a," "an," and "the" include plural forms, especially in the sense of "one or more", unless the context clearly dictates otherwise.

Polyamide 6 comprising fishing nets and material derived from polyamide 6 comprising fishing nets can contain a whole variety of compounds added during their polymerization, the formation of the threads or afterwards to achieve different property variations. These compounds include, e.g., brightening agents, stiffening agents, anti-static lubricants, colorants, brightening agents, spin finish, agents for surface smoothness, anti-oxidation agents, UV stabilizers, and so on. The composition of the fishing nets and material derived from polyamide 6 comprising fishing nets is also dependent on their exact application. Nets for fish farming, purse-seine nets and nets for bottom trawling thus have a different chemical composition.

Surfaces immersed in the seawater rapidly get covered with marine organisms, called marine biological fouling or biofouling. Biofouling assemblages are a complex phenomenon resulting from several processes, the rate and extent of which are influenced by numerous physical, chemical and biological factors in the immediate proximity of the surface and affects most of the wet surfaces, resulting in significant financial costs. Accumulation of algae and barnacles increases the ship's drag and destroys protection and the equipment used in aquaculture.

Nowadays, anti-fouling paints are formulated with toxic copper or other biocides to prevent the growth of sessile marine organisms. Copper is an effective and still widely used biocide. However, its effectiveness is relatively short, often only a few months, so cleaning and paint reapplication are frequently required. Besides economics, leaching of copper or other biocides causes contamination of the sea water and problems for non-target organisms.

The process of the invention has the advantage that unlike processes of the prior art that were, e.g., restricted to rather pure polyamide 6-containing materials, like carpets, and PA 6 comprising spinning waste, the process of the invention is not so limited and in particular can also be applied very successfully to polyamide 6 comprising fishing nets and material derived from polyamide 6 comprising fishing nets of any kind.

Possible Pre-Treatment Steps

Before being subjected to step a) of the process of the invention, the material derived from polyamide 6 comprising fishing nets preferably undergo a pre-treatment in pre-treatment section [A], in particular size reduction in a mechanical size reduction section [β] and/or cleaning in a cleaning section [α]. This has the advantage that the material derived from polyamide 6 comprising fishing nets that is charged to the depolymerization section [B] is less contaminated with non-polyamide 6 materials, which improves the yield and the purity of the epsilon-caprolactam that is produced in the chemical plant of the invention. Another advantage is that polyamide 6 comprising fishing nets that are size-reduced can be more easily handled.

As used herein, the term "cleaning" is defined as any process of removing non-Nylon 6 materials that are adhered to polyamide 6 comprising fishing nets or that are mixed with polyamide 6 comprising fishing nets. Cleaning is advantageous because any non-Nylon 6 material that is removed will consequently not perturb the next steps of the process of the invention.

(Wasted) polyamide 6 comprising fishing nets might be mixed with a whole range of other materials, like rocks, metal materials (e.g., lines, chains, anchors), organic materials (e.g., dead fish and mussels) and other (marine) litter (e.g., ropes, (Styrofoam) floats and sink lines). In addition, (wasted) polyamide 6 comprising fishing nets might be mixed with non-polyamide 6 fishing nets, like those made of polyamide 6,6, polyethylene terephthalate (PET), polypropylene (PP) or polyethylene (PE). (Wasted) polyamide 6 comprising fishing nets can also be coated, e.g., with an anti-fouling coating based on metals like copper or with a non-metal containing anti-fouling coating.

The dimensions of (wasted) polyamide 6 comprising fishing nets depend very much on the exact application. (Wasted) polyamide 6 comprising fishing nets range from a few square meters up to more than 200,000 square meters. Such huge nets are, e.g., purse-seine nets and nets which are set vertically in the water with floats attached to the upper edge, weights attached to the lower edge and a series of rings through which the pursing cable passes can be as long as 1.5 km and more than 150 m deep.

Preferably, the polyamide 6 comprising fishing nets are fragmented into pieces before they are depolymerized in the depolymerization section [B] in step a). This mechanical pre-treatment, i.e., the mechanical comminution or fragmentation of the polyamide 6 comprising fishing nets, can be achieved, e.g., by cutting, shredding, milling, grinding and/or chipping. In a preferred embodiment, polyamide 6 comprising fishing nets are charged to step a) in the form of pieces which have, a weight ranging from 0.005 gram to 100 kg, preferably from 0.01 gram to 10 kg and most preferably from 0.02 gram to 1 kg. Using pieces of material derived from polyamide 6 comprising fishing nets with the aforementioned weights has the advantage that the pieces can be more easily handled and/or cleaned by washing with a solvent.

Optionally, prior to the mechanical comminution or fragmentation of the polyamide 6 comprising fishing nets, large metal fragments, rocks and other disturbing materials that cause severe wear of the equipment used for the mechanical comminution or fragmentation are removed. Preferably, non-polyamide 6 comprising materials, like polyethylene, polypropylene and polyamide 6,6 comprising materials, like fishing nets, are removed prior to the mechanical comminution or fragmentation of the polyamide 6 comprising fishing nets or afterwards as described further below. The removal of foreign materials can be done mechanically or manually. The removal of these disturbing materials has the advantage that the maintenance costs of the equipment used for the mechanical comminution or fragmentation can be reduced to a large extent. In addition, the polyamide 6 content of the material obtained after mechanical comminution or fragmentation is higher than without removal of the disturbing materials. In particular, the removal of polyamide 6,6 is advantageous because it disturbs the depolymerization of polyamide 6, gives blockage in the reactor itself, reduces the recovery yield of epsilon-caprolactam and disturbs the subsequent purification of the recovered epsilon-caprolactam.

Preferably, (polyamide 6 comprising) fishing nets with Cu-based anti-fouling coatings are also removed prior to the mechanical comminution or fragmentation of the polyamide 6 comprising fishing nets. More preferably, the fishing nets with Cu-based anti-fouling coating are washed in an additional, separate washing step so that the Cu-based anti-fouling coatings are removed. This washed net material can then be added to material with a similar composition.

Optionally, foreign materials are separated from the polyamide 6 comprising fishing nets that have been mechanically comminuted or fragmentated. To this end, various separation processes can be applied, including, but not limited to, density separation and magnetic separation. In density separation, materials of different densities are placed in a liquid of intermediate density, where the less dense material floats and separates out from the more dense sinking material. In practice, density separation is often done by a series of density separation stages. E.g., in one stage, the high density materials like rocks, sand and metals (including iron and lead) are separated off, while in another stage low density materials, like polyolefins polypropylene and polyethylene, are separated off. Magnetic separation is the process of separating components of mixtures by using magnets to attract magnetic materials. The process that is typically used for magnetic separation detaches non-magnetic material from magnetic material. The removal of foreign materials in the comminuted or fragmented polyamide 6 comprising fishing nets is advantageous because such materials can disturb the depolymerization of polyamide 6, reduce the recovery yield of epsilon-caprolactam and disturb the subsequent purification of the recovered epsilon-caprolactam.

Optionally, the polyamide 6 comprising fishing nets are cleaned by washing with a solvent, preferably water, prior to being charged to the depolymerization section [B]. Preferably, washing agents ranging in concentrations from 0 to 20% by weight relative to the solvent are added to the solvent for an improved washing efficiency. NaOH is a preferred washing agent. Preferably, an aqueous solution that contains 0 to 10% by weight NaOH is used in the washing step, still more preferably 0 to 5% by weight NaOH. Preferably, Cu-based anti-fouling coatings are removed by washing with an aqueous solution that contains 1 to 5% by weight NaOH, preferably 1.5 to 3% by weight NaOH, more preferably about 2% by weight NaOH. The enhanced washing effect of NaOH is most probably caused by enhanced hydrolysis of molecules, including biopolymers and non-biopolymers. Moreover, it is known that NaOH hydrolyses co-polymers, like polyethylene-vinyl acetate (PEVA, a.k.a. EVA), that are used in Cu-based anti-fouling coatings. Preferably, the washing solvent is heated to further enhance the washing process. In another preferred embodiment, the washing process includes a final rinsing step with (dean) washing solvent without washing agent in order to remove residues of washing agent and dirt present that are adhering to the polyamide 6 comprising fishing nets.

The washing is preferably carried out under friction. Different types of industrial washing systems are available on the market, like high speed friction washers.

Washing of the polyamide 6 comprising fishing nets, in particular of mechanically comminuted or fragmented polyamide 6 comprising fishing nets, is advantageous because any (adhering) dirt is removed which consequently does not perturb the next steps of the process of the invention.

Optionally, the polyamide 6 comprising fishing nets are dried after the cleaning step and prior to being charged to the depolymerization section [B]. This has the advantage that the weight of the cleaned polyamide 6 comprising fishing nets is reduced and that the next process step is not affected by dilution or contamination with the washing solvent.

Optionally, polyamide 6 comprising fishing nets, that are preferably washed and reduced in size, are charged to a smelter (e.g., an extruder). In the smelter the polyamide 6 comprising fishing nets are melted. Preferably, the resulting polymer melt is filtered. This has the advantage that solid impurities are removed. The melted and optionally filtered polymer melt is then cooled and fed to a pelletizer. The pelletizer cuts the product into pellets. Preferably, the pellets or the melted and optionally filtered polymer melt are charged directly to the depolymerization section [B].

The dimensions and the shape of the pellets (also often called granules) can be chosen within wide limits. In general, pellets are cylindrical in shape (originating from thin strands that are chopped into pieces). Other shapes like (non-perfect) spheres, however, are also possible. The dimensions of the pellets can be chosen within wide limits. Usually, pellets have a diameter that ranges from 1 to 10 mm, preferably from 2 to 7 mm, more preferably from 3 to 5 mm. In a preferred embodiment, pellets have a length that ranges from 1 to 50 mm, preferably from 2 to 25 mm, more preferably from 3 to 15 mm.

Pelletization of polyamide 6 comprising fishing nets that are preferably washed and reduced in size has the advantage of an increased bulk density, which reduces the costs of intermediate storage and transportation in case the pretreatment is done at a different location (see below). Apart from density increase, pelletization also offers other benefits, such as a homogeneous shape and structure of the to-be-treated material which is advantageous for (automated) feeding into the depolymerization section [B].

The site where the pre-treatment of the polyamide 6 comprising fishing nets is performed and the site as where the depolymerization section [B] is located can be the same. However, preferably, one or more of the pre-treatment steps are done at different locations, e.g., near a harbor where the wasted polyamide 6 comprising fishing nets are collected and/or at a location that is specialized in pre-treatment of wasted fishing nets. Polyamide 6 comprising fishing nets that are pre-treated at various locations can then be charged to the depolymerization section [B] of the (chemical) plant of the invention for the production of purified epsilon-caprolactam from material derived from polyamide 6 comprising fishing nets.

The Charging Step a)

In step a) of the invention, the material derived from polyamide 6 comprising fishing nets that optionally have been reduced in size and/or washed are charged to the depolymerization section [B]. The depolymerization section [B] comprises one or more depolymerization reactors that are operated in series and/or in parallel.

In one embodiment, the polyamide 6 comprising fishing nets are mechanically compressed into a smaller volume prior to being charged to the depolymerization section [B]. This has the advantage that less volume is needed for intermediate storage and transport and can also facilitate dosing to the depolymerization section [B].

In another embodiment, the polyamide 6 comprising fishing nets are compressed into particles with an increased density prior to being charged to the depolymerization section [B], e.g., by mechanical compaction or by extrusion of melted material followed by cooling and cutting it to size. Again, this has the advantage that less volume is needed for intermediate storage and transport and can facilitate dosing to the depolymerization section [B].

In a further preferred embodiment, the polyamide 6 comprising fishing nets are dried before being charged to the depolymerization section [B], in particular after subjecting the polyamide 6 comprising fishing nets to a cleaning step. This has the advantage that less or no solvent is introduced to the depolymerization section [B]. Solvent introduced in the depolymerization section [B] is expected to negatively influence the depolymerization process (e.g., reduced depolymerization reaction rates, higher consumption of catalyst, higher energy consumption, and the vapor stream comprising epsilon-caprolactam and water that is obtained in the depolymerization section [B] is expected to contain more impurities).

The material derived from polyamide 6 comprising fishing nets are preferably fed to the depolymerization reactor(s) as a solid phase or as a melt. Preferably, the material derived from polyamide 6 comprising fishing nets are charged as a melt. Feeding as a melt can be achieved by using an extruder, gear pump, or other means known by the skilled person.

The feeding of the material derived from polyamide 6 comprising fishing nets to the depolymerization reactor(s) may be realized by continuous or by intermittent dosing of the material derived from polyamide 6 comprising fishing nets.

The Depolymerization Step b)

In the depolymerization section [B], the material derived from polyamide 6 comprising fishing nets are depolymerized to form epsilon-caprolactam. The formed epsilon-caprolactam is discharged from the depolymerization section [B] as an epsilon-caprolactam comprising stream.

The depolymerization of the material derived from polyamide 6 comprising fishing nets is achieved by increasing the temperature of the material derived from polyamide 6 comprising fishing nets to a temperature of at least 180° C., but not higher than 400° C. in the depolymerization section [B]. The preferred temperature range for the depolymerization reaction is from 200° C. to 350° C., more preferably from 220° C. to 340° C., and most preferably from 240° C. to 325° C.

Generally, the rate of epsilon-caprolactam formation increases at elevated temperatures. Temperatures lower than 400° C. are preferred since at temperatures above 400° C. side reactions of polyamide 6 and reactions of impurities occur more frequently which will result in formation of a more diverse set of impurities. Part of these impurities will end-up in the epsilon-caprolactam comprising product stream that is discharged from the depolymerization reactor(s). In a preferred embodiment of the invention, the depolymerization of the polyamide 6 comprising fishing nets is conducted at temperatures ranging of from 220° C. to 340° C. or 240° C. to 325° C. Experiments have shown that this temperature range allows production of particularly pure epsilon-caprolactam.

The pressure in the depolymerization section [B] can vary and might range from 1 kPa to 100 MPa, preferably from 10 kPa to 5 MPa, more preferably from 25 kPa to 2 MPa, most preferably from 50 kPa to 1 MPa. Experiments have shown that this pressure range allows production of particularly pure epsilon-caprolactam.

The depolymerization of material derived from polyamide 6 comprising fishing nets can be achieved in the presence or in the absence of a solvent. Preferably, the depolymerization of the material derived from polyamide 6 comprising fishing nets is achieved in the presence of water as solvent. In this case, the water is preferably in the form of steam, in particular superheated steam.

Preferably, depolymerization will be complete in 0.1 hour to 24 hours, more preferably in 0.5 hour to 6 hours.

Feeding the water as steam to the depolymerization reactor allows, optionally without further heating, to obtain a vapor stream comprising epsilon-caprolactam and water. The weight to weight ratio of epsilon-caprolactam to water in this vapor stream can be adjusted by modifying the amount of steam that is fed to the material derived from polyamide 6 comprising fishing nets in the depolymerization section [B]. In a preferred embodiment, the depolymerization in step b) is performed in the presence of water, whereby the epsilon-caprolactam comprising stream is a vapor stream comprising epsilon-caprolactam and water in a weight to weight ratio of from 1:1 to 1:50, preferably from 1:2 to 1:15, more preferably from 1:2 to 1:10 and most preferably from 1:3 to 1:8.

Preferably, the epsilon-caprolactam in the vapor stream comprising epsilon-caprolactam and water has a partial pressure of 5 kPa to 1 MPa, more preferably of 10 kPa to 0.5 MPa, and most preferably of 15 kPa to 0.1 MPa.

During the depolymerization reaction, decomposition products may be formed including linear oligomers of epsilon-caprolactam and cyclic oligomers of epsilon-caprolactam. In addition, the feed stream of the material derived from polyamide 6 comprising fishing nets may also contain other components, i.e., Impurities such as non-polyamide 6 compounds and residues of solvents(s) applied in the pre-treatment that remain stable, react or decompose under the depolymerization conditions. Thus, in case water is used as solvent then the vapor stream which is removed from the depolymerization section [B] does not only comprise water and epsilon-caprolactam, but also impurities.

Preferably, superheated steam with a temperature between 100° C. and 600° C. is charged to the depolymerization reactor(s). Preferably, the superheated steam that is charged to the depolymerization reactor(s) has a temperature of at least the melting temperature of polyamide 6. Preferably, the energy content of the superheated steam that is charged to the depolymerization reactor(s) is sufficiently high so that no other heat input is needed for performing the depolymerization reaction and evaporating the formed epsilon-caprolactam. In another preferred embodiment, the depolymerization section [B] is charged with superheated steam having a temperature ranging of from 220° C. to 575° C. In an even more preferred embodiment, the depolymerization section [B] is charged with super-heated steam having a temperature ranging of from 275° C. to 500° C.

Generally, the mass of the vapor stream, which is removed from the depolymerization section [B], is less than the mass of the total feed to the depolymerization section. The total feed to the depolymerization section [B] comprises material derived from polyamide 6 comprising fishing nets and optionally solvent, catalyst, additional agents and/or depolymerizing agents. Thus, without any additional measures, there will be an accumulation of material (often called 'residual material') in the depolymerization section [B]. Preferably, another stream is discharged from the depolymerization section [B]. This has the advantage that the accumulation of material in the depolymerization section [B] is reduced or avoided. The additional stream can comprise impurities present in material derived from polyamide 6 comprising fishing nets, non-depolymerized polyamide, non-evaporated epsilon-caprolactam, catalyst(s) and compounds that were formed under the depolymerization conditions, like mono-, di- and/or triammonium phosphate, in case phosphoric acid is used as depolymerization catalyst. In a preferred embodiment, a stream comprising mono-, di- and/or triammonium phosphate is discharged from the depolymerization section [B]. Even more preferably, this stream, which is intermittently or continuously discharged from the depolymerization section [B], comprises mono-, di- and/or triammonium phosphate in a weight fraction of 0.01 to 50% by weight, preferably from 0.1 to 25% by weight, more preferably from 0.5 to 10% by weight, most preferably from 0.5 to 5% by weight.

The depolymerization of the material derived from polyamide 6 comprising fishing nets in the presence of steam can be performed with the presence of additional depolymerizing agents, such as ammonia. The concentration of ammonia in the depolymerization section [B] can vary. Thus, in case ammonia is present in the depolymerization section [B], then the vapor stream which is removed from the depolymerization section [B] does not only comprise epsilon-caprolactam and impurities, but may also comprise ammonia.

Most preferably, the depolymerization is carried out in the presence of a catalyst. Preferably, the used catalyst is a (Lewis or Brønsted) acid or base. The acid catalyst can in particular be selected from the group consisting of ortho-phosphoric acid, p-toluenesulfonic acid, boric acid, sulfuric acid, organic acid, organic sulfonic acid including xylene-sulfonic acid, 4-sulfoisophthalic acid and other sulfonated aromatic hydrocarbons, solid acid, salts of the aforementioned acids, $Al_2O_5$ and $SiO_2$, and combinations thereof. The base catalyst can, e.g., be selected from the group consisting of alkali hydroxide, alkali salt, alkaline earth hydroxide and alkali such as earth salts, organic bases and solid bases, and combinations thereof. Preferably, orthophosphoric acid, boric acid, organic acid, alkali hydroxides and alkali salts are used as catalysts. More preferably, orthophosphoric acid, sodium phosphate, potassium phosphate, sodium hydroxide, potassium hydroxide, sodium carbonate, potassium carbonate, sodium hydrogen carbonate and potassium hydrogen carbonate are used as catalysts. Still more preferably, orthophosphoric acid, p-toluenesulfonic acid, boric acid and sodium hydroxide are used as catalysts. In one particularly preferred embodiment, orthophosphoric acid is used as catalyst for the depolymerization, in another, p-toluenesulfonic acid is used.

In another preferred embodiment, however, no catalyst is used for the depolymerization of the material derived from polyamide 6 comprising fishing nets. This has the advantage of lower costs (both for the catalyst and the disposal of catalyst waste). However, higher temperatures (and pressures) are usually required.

The advantage of using a catalyst (and especially of orthophosphoric acid) is that the depolymerization reaction already starts at lower temperatures and can be performed under atmospheric conditions. A suitable concentration of catalyst used for the depolymerization of material derived from polyamide 6 to epsilon-caprolactam is known to the skilled person and can easily be determined by routine experimentation. If the concentration of the used catalyst is too low, the reaction rate is slow. On the contrary, if the concentration of the used catalyst is too high, the reaction is fast, but also side reaction(s) increase. Moreover, the catalyst costs are increased, which is economically disadvantageous. Preferably, the catalyst content is from 0.01 to 100% by weight relative to the polyamide 6 contained in the depolymerization reactor. Even more preferably, the catalyst content is from 0.1 to 50% by weight. The optimum catalyst concentration depends on the type of catalyst that is applied for the depolymerization of polyamide 6. For the catalyst orthophosphoric acid, the preferred content is from 0.1 to 25% and more preferred from 1 to 20% by weight. The preferred content for the catalyst p-toluenesulfonic acid is from 10 to 35% by weight and the more preferred content from 15 to 30% by weight.

The depolymerization of polyamide 6 can be performed in a batch mode, in a semi-continuous mode or in a continuous mode, all of which are known to the skilled person. The terms "batch mode", "semi-continuous mode" and "continuous mode", as used herein, refer to the mode in which the polyamide 6 containing feed stock, i.e., the material derived from polyamide 6 comprising fishing nets, and optionally catalyst are charged to the depolymerization reactor and to the mode in which the residual material is discharged from the depolymerization reactor.

In a preferred embodiment, the polyamide 6 depolymerization is performed in the batch mode. In the batch mode, the feed stock, i.e., the material derived from polyamide 6 comprising fishing nets, and optionally catalyst are initially charged to the depolymerization reactor. Subsequently, superheated steam is charged to the depolymerization reactor and epsilon-caprolactam is discharged from the depolymerization reactor as vapor stream comprising epsilon-caprolactam and water. Next, charging of the superheated steam to the depolymerization reactor is interrupted. After optionally removing residual material from the depolymerization reactor, a new cycle is started by charging feed stock (and optionally catalyst) to the depolymerization reactor. In a preferred embodiment, residual material is not removed in between every cycle.

In a particular advantageous embodiment, the polyamide 6 depolymerization is performed in the continuous mode. In the continuous mode, the material derived from polyamide 6 containing feed stock (and optionally catalyst) is continuously charged to the depolymerization reactor. At the same time, superheated steam is continuously charged to the depolymerization reactor and epsilon-caprolactam is continuously discharged from the depolymerization reactor as vapor stream comprising epsilon-caprolactam and water. Optionally, the catalyst is continuously or intermittently charged to the depolymerization reactor. In addition, residual material is continuously discharged from the depolymerization reactor. Preferably, the material derived from polyamide 6 comprising fishing nets are charged as a melt. Preferably, the catalyst is charged as a melt, a slurry or a solution.

In another preferred embodiment, the polyamide 6 depolymerization is performed in the semi-continuous mode. In the semi-continuous mode, the material derived from polyamide 6 containing feed stock (and optionally catalyst) is intermittently charged to the depolymerization reactor, while superheated steam is continuously charged to the depolymerization reactor and epsilon-caprolactam is continuously discharged from the depolymerization reactor as a vapor stream comprising epsilon-caprolactam and water. Residual material is intermittently discharged from the depolymerization reactor in the semi-continuous mode of polyamide 6 depolymerization.

The Recovery Step c)

In the recovery section [C], epsilon-caprolactam is recovered from the epsilon-caprolactam comprising stream that is discharged from the depolymerization section [B]. This stream comprises epsilon-caprolactam and impurities. Preferably, this recovery is performed by a (partial) condensation of the epsilon-caprolactam comprising stream.

Preferably, in case no solvent is charged to the depolymerization section [B], the epsilon-caprolactam that is obtained by condensation is dissolved in water, whereby an epsilon-caprolactam-rich phase is obtained. This epsilon-caprolactam-rich phase also comprises impurities.

Preferably, in case water is charged to the depolymerization section [B] as solvent, the epsilon-caprolactam comprising stream that is discharged from the depolymerization section [B] comprises epsilon-caprolactam, water and impurities. The epsilon-caprolactam can be separated from the remaining components of the vapor stream by sending the vapor stream from the depolymerization reactor, preferably overhead, to a (preferably partial) condenser to obtain a condensate containing epsilon-caprolactam. Preferably, the epsilon-caprolactam is separated from the remaining components of the vapor stream by sending the product stream from the depolymerization reactor, preferably overhead, to a distillation column from which a water-rich phase is obtained as top product and a epsilon-caprolactam-rich phase as bottom product.

The epsilon-caprolactam recovered in the recovery section [C] is crude since it contains impurities such as polyamide 6 decomposition products or other impurities stemming from non-polyamide 6 components of the material derived from polyamide 6 comprising fishing nets. The crude epsilon-caprolactam that is recovered in step c) comprises water and epsilon-caprolactam, preferably it is an aqueous solution comprising epsilon-caprolactam. Thus, the crude epsilon-caprolactam recovered in the recovery section [C] requires additional purification to yield high purity epsilon-caprolactam. "Crude" as used herein can therefore be defined as being less pure, i.e., containing less impurities, than the purified epsilon-caprolactam obtained as the product of the process of the invention.

Preferably, the crude epsilon-caprolactam comprises epsilon-caprolactam in the range of from 6 to 95% by weight, more preferably from 20 to 90% by weight, and most preferably from 35 to 80% by weight. The remainder is mainly water.

The Purification Step d)

In step d) the crude epsilon-caprolactam which is obtained in the recovery section [C] is purified in the purification section [D] to yield high purity epsilon-caprolactam.

Optionally, the crude epsilon-caprolactam is filtered before being charged to the purification section [D]. The filtration ensures the removal of undissolved impurities which could otherwise hinder the further purification process.

Optionally, oil is separated from the crude epsilon-caprolactam before being charged to the purification section [D]. The oil separation ensures the removal of impurities which could otherwise hinder the further purification process.

Purified epsilon-caprolactam is obtained from the crude epsilon-caprolactam by first extracting in step (i) the crude epsilon-caprolactam with an organic solvent, whereby an aqueous phase and an organic phase comprising the organic solvent, epsilon-caprolactam and impurities are obtained. The organic solvent with which the crude epsilon-caprolactam is extracted is preferably an aromatic hydrocarbon, an aliphatic hydrocarbon, a cycloaliphatic hydrocarbon, a halogenated hydrocarbon and/or a $C_4$-$C_{10}$ aliphatic or cycloaliphatic alcohol. Optionally, the organic solvent with which the crude epsilon-caprolactam is extracted is preferably a mixed extractant which consists of an aromatic hydrocarbon, an aliphatic hydrocarbon, a cycloaliphatic hydrocarbon, a halogenated hydrocarbon and/or a $C_4$-$C_{10}$ aliphatic or cycloaliphatic alcohol, and a $C_5$-$C_8$ alkane or $C_5$-$C_8$ cycloalkane. Particularity good purification results are achieved if the organic solvent for extraction of the crude epsilon-caprolactam is selected from the group consisting of cyclohexane, benzene, toluene, methylene chloride, chloroform, trichloroethane, 4 methyl-2-pentanol (a.k.a. MIBC, methyl isobutyl carbinol), 1-octanol, 2-ethylhexanol and mixtures thereof. More preferably, the organic solvent for extraction of the crude epsilon-caprolactam is selected from the group consisting of benzene, toluene, alcohols, and mixtures thereof. Still more preferably, the organic solvent for extraction of the crude epsilon-caprolactam is selected from the group consisting of toluene, 1-octanol, 4-methyl-2-pentanol, 2-ethylhexanol, and mixtures thereof. Preferably, the weight ratio of organic solvent to epsilon-caprolactam is from 0.01:1 to 40:1, preferably from 0.05:1 to 10:1 and more preferably from 0.1:1 to 5:1.

Optionally, the organic solvent for extraction of the crude epsilon-caprolactam is mixed with an alkane, $C_mH_{2m+2}$ wherein m is 5 to 8, a cycloalkane or $C_mH_{2m}$ wherein m is 5 to 8 so that a mixed extraction agent is formed. Particularly good results are achieved if the alkane or cycloalkane is present in the mixed extraction agent in the range of from 5 to 90% and preferably from 25 to 75% by weight of the total weight of the mixed extraction agent.

In another embodiment, in which the organic solvent has a lower density than the crude epsilon-caprolactam, the extraction with organic solvent in step d)(i) is carried out in a counter-current operated extraction column, whereby the crude epsilon-caprolactan to be purified is introduced at the upper part and the organic solvent at the lower part of the column. The extraction results in an aqueous phase comprising water and impurities, and an organic phase comprising the organic solvent, epsilon-caprolactam and impurities. The extraction results in an organic phase comprising the organic solvent, epsilon-caprolactam and impurities, with a weight ratio of impurities to epsilon-caprolactam that is reduced compared to the weight ratio of impurities to epsilon-caprolactam in the crude epsilon-caprolactam. So, as a consequence of this extraction, the epsilon-caprolactam is purer than before the extraction.

In another embodiment of the invention, in which the organic solvent has a higher density than the crude epsilon-caprolactam, the extraction with organic solvent in step d)(i) is carried out in a counter-current operated extraction column, whereby the crude epsilon-caprolactam to be purified is introduced at the lower part and the organic solvent at the upper part of the column. The extraction results in an aqueous phase comprising water and impurities, and an organic phase comprising the organic solvent, epsilon-caprolactam and impurities. The extraction results in an organic phase comprising the organic solvent, epsilon-caprolactam and impurities, with a weight ratio of impurities to epsilon-caprolactam that is reduced compared to the weight ratio of impurities to epsilon-caprolactam in the crude epsilon-caprolactam. So, as a consequence of this extraction, the epsilon-caprolactam is purer than before the extraction.

Optionally, the organic phase comprising the organic solvent, epsilon-caprolactam and impurities is washed with water or with an aqueous alkaline solution before entering step d)(ii). If washing is performed with an aqueous alkaline solution, the alkaline solution is preferably an aqueous solution comprising an alkali metal hydroxide and/or alkali metal carbonate, preferably sodium hydroxide or potassium hydroxide. Said alkali metal hydroxide solution preferably comprises 0.5 to 2.0% by weight of sodium hydroxide or potassium hydroxide.

The skilled person can determine by routine experimentation the amount of water or aqueous alkaline solution necessary for efficient washing of the organic phase comprising the organic solvent, epsilon-caprolactam and impurities. Preferably, this amount is between 0.1 and 5% by weight relative to the amount of organic solvent excluding epsilon-caprolactam dissolved in the to-be-washed organic phase. In another preferred embodiment, the washing of the organic phase comprising the organic solvent, epsilon-caprolactam and impurities with water or aqueous alkaline solution is carried out in a counter current operated washing column, whereby the organic phase comprising the organic solvent, epsilon-caprolactam and impurities is introduced at the bottom and the water or aqueous alkaline solution at the top of the column. The washing results in a washed organic phase comprising the organic solvent, epsilon-caprolactam and impurities and an aqueous residue-comprising phase. Usually, the aqueous residue-comprising phase comprises water, epsilon-caprolactam and impurities. As a consequence of the washing, the impurity content of the washed organic phase is reduced compared to the impurity content of the organic phase before washing.

Subsequently, according to step d)(ii) of the process of the invention, the obtained organic phase comprising the organic solvent, epsilon-caprolactam and impurities, that is optionally washed with water or with an aqueous alkaline solution, is solvent switched, whereby the organic solvent in the organic phase comprising the organic solvent, epsilon-caprolactam and impurities is replaced by water and whereby an aqueous phase comprising water, epsilon-caprolactam and impurities with lower- or higher-boiling points than epsilon-caprolactam is obtained and wherein the solvent switch process is selected from processes based on back-extraction (a.k.a. reextraction) with water, and processes based on solvent swap distillation, whereby the organic solvent is distilled off and water is charged.

The term "replaced" as used herein means that at least 60%, preferably at least 80% and most preferably at least 90, 95 or 98% by weight of the organic solvent present in the organic phase comprising the organic solvent, epsilon-caprolactam and impurities is replaced by water.

The solvent switch can be a process based on back-extraction with water, whereby an aqueous phase comprising water, epsilon-caprolactam and impurities with lower- or higher-boiling points than epsilon-caprolactam is obtained. Preferably, this aqueous phase comprising water, epsilon-caprolactam and impurities with lower- or higher-boiling points than epsilon-caprolactam is stripped and/or distilled to remove residual organic solvent. Although the amount of the water used for the back-extraction of epsilon-caprolactam can vary, the amount of the water used is preferably 0.3 to 20 times, more preferably 0.4 to 10 times and most preferably 0.5 to 6 times by weight based on the recovered epsilon-caprolactam.

Preferably, the back-extraction with water can be carried out in a counter-current operated extraction column.

In another preferred embodiment, in which the organic phase comprising the organic solvent, epsilon-caprolactam and impurities, that has been optionally washed, has a lower density than water, the organic phase is introduced at the lower part of the extraction column and the water at the upper part of the extraction column. The back-extraction results in an aqueous phase comprising water, epsilon-caprolactam and impurities with lower- or higher-boiling points than epsilon-caprolactam and in an organic solvent phase that comprises impurities. The back-extraction results in an aqueous phase comprising water, epsilon-caprolactam and impurities with lower- or higher-boiling points than epsilon-caprolactam, with a weight ratio of impurities to epsilon-caprolactam that is reduced compared to the weight ratio of impurities to epsilon-caprolactam in the organic phase comprising the organic solvent, epsilon-caprolactam and impurities prior to the back-extraction. Thus, because of the back-extraction, purer epsilon-caprolactam is obtained. Preferably, the organic solvent phase that comprises impurities is, optionally after purification (preferably by distillation), re-used.

In another preferred embodiment, in which the organic phase comprising the organic solvent, epsilon-caprolactam and impurities has a higher density than water, the organic phase is introduced at the upper part of the extraction column and the water at the lower part of the extraction column. The back-extraction results in an aqueous phase comprising water, epsilon-caprolactam and impurities with lower- or higher-boiling points than epsilon-caprolactam and in an organic solvent phase that comprises impurities. The back-extraction results in an aqueous phase comprising water, epsilon-caprolactam and impurities with lower- or higher-boiling points than epsilon-caprolactam, with a weight ratio of impurities to epsilon-caprolactam that is reduced compared to the weight ratio of impurities to epsilon-caprolactam in the organic phase comprising the organic solvent, epsilon-caprolactam and impurities prior to the back-extraction. Thus, because of the back-extraction, the epsilon-caprolactam is purer than before the back-extraction. Preferably, the organic solvent phase that comprises impurities is, optionally after purification (preferably by distillation), re-used.

Therefore, according to a particular advantageous embodiment of the invention, after the extracting of the crude epsilon-caprolactam in step d)(i), the purification in step d) also comprises the step of (ii) solvent switching based on back-extraction with water.

The solvent switch process can also be a process based on solvent swap distillation, whereby the organic solvent is distilled off and water is charged. In a preferred embodiment, the solvent switch process is a process based on solvent swap distillation that is performed as a single-stage process, whereby the organic solvent is distilled off from the organic phase comprising the organic solvent, epsilon-caprolactam and impurities, and water is charged. More preferably, the solvent switch is performed as an azeotropic distillation with water addition in which case the organic solvent is evaporated as an azeotropic mixture comprising organic solvent and water. The purpose of the azeotropic distillation is to remove organic solvent and to add water. Preferably, substantially all of the organic solvent is removed. "Substantially all" in this context means that at least 90%, preferably at least 95% and most preferably at least 98 or 99% by weight of the organic solvent present in the organic phase comprising the organic solvent, epsilon-caprolactam and impurities is removed. Preferably, the water is added as a liquid. More preferably, water, in the liquid state, is added to the upper part of the distillation column as reflux. Even more preferably, a part of the water that is added as reflux is obtained by condensation of the azeotropic mixture that is distilled off in the distillation column.

Any suitable vessel may be used for the solvent switch process, for example a column, preferably a distillation column that is operated in a continuous mode. The distillation column may include trays, packing or a combination thereof.

In another preferred embodiment, the solvent swap distillation is performed as a two-stage process. The first stage is a pre-concentration stage and the second stage is the actual solvent swap distillation.

The organic phase comprising the organic solvent, epsilon-caprolactam and impurities is charged to the first stage. In the first stage, a first fraction of the organic solvent is removed by distillation from the organic phase comprising the organic solvent, epsilon-caprolactam and impurities at the upper part of the distillation column. Preferably, this distillation is performed under reflux. Under reflux means that organic solvent, in the liquid phase, is charged to the upper part of the distillation column. More preferably a part of the organic solvent that is removed by distillation at the upper part of a distillation column is, after condensation, charged as a liquid to the upper part of the distillation column. The remaining organic phase comprising the organic solvent, epsilon-caprolactam and impurities is discharged from the first stage and charged to the second stage. Due to distillation in the first stage, the chemical composition of the remaining organic phase comprising the organic solvent, epsilon-caprolactam and impurities is different from the organic phase comprising the organic solvent, epsilon-caprolactam and impurities that is charged to the first stage. Generally, compared to the organic phase comprising the organic solvent, epsilon-caprolactam and impurities that is charged to the first stage, the remaining organic phase comprising the organic solvent, epsilon-caprolactam and impurities contains a higher amount in percent weight of epsilon-caprolactam and compounds with a higher boiling point than epsilon-caprolactam and a lower percent in weight of compounds with a boiling point lower than epsilon-caprolactam.

In the second stage, the remaining organic solvent is distilled off from the remaining organic phase comprising the organic solvent, epsilon-caprolactam and impurities, and water is charged. More preferably, in the second stage, the solvent switch is performed as an azeotropic distillation with water addition in which case the organic solvent is evaporated as an azeotropic mixture comprising organic solvent and water.

The purpose of the azeotropic distillation is to remove organic solvent and to add water. Preferably, substantially all of the organic solvent is removed. "Substantially all" in this context means that at least 90%, preferably at least 95% and most preferably at least 98% or 99% by weight of the organic solvent present in the remaining organic phase comprising the organic solvent, epsilon-caprolactam and impurities is removed. Preferably, the water is added as a liquid. More preferably, water, in the liquid state, is added to the upper part of the distillation column as reflux. Even more preferably, a part of the water that is added as reflux is obtained by condensation of the azeotropic mixture that is distilled off in the distillation column.

Any suitable vessel may be used in each stage for the solvent switch, for example a column, preferably a distillation column that is operated in a continuous mode. The distillation column may include trays, packing or a combination thereof.

The solvent swap distillation (either performed as a single-stage process or as a two-stage process) results in an aqueous phase comprising water, epsilon-caprolactam and impurities with lower- or higher-boiling points than epsilon-caprolactam and optionally residual organic solvent. Preferably, the epsilon-caprolactam content of this aqueous phase is between 25 and 99.9%, more preferably between 50 and 99.5% and most preferably between 85 and 99% by weight relative to the entire aqueous phase.

Therefore, according to a particular advantageous embodiment of the invention, after the extracting of the crude epsilon-caprolactam in step d)(i), the purification in step d) also comprises the step of (ii) solvent switching based on solvent swap distillation.

In step d)(iii) of the process of the invention, the aqueous phase comprising water, epsilon-caprolactam and impurities with lower- or higher-boiling points than epsilon-caprolactam that is obtained by solvent switching in step d)(ii) is distilled to remove impurities with lower- or higher-boiling points than epsilon-caprolactam from said aqueous phase.

Preferably, water is evaporated first from the aqueous phase comprising water, epsilon-caprolactam and impurities with lower- or higher-boiling points than epsilon-caprolactam. Following the evaporation of water, the epsilon-caprolactam is distilled to recover high purity epsilon-caprolactam. Preferably, the distilling is carried out at reduced pressure. Even more preferably, the distillation is effected at a pressure of less than 50 kPa, more preferably less than 20 kPa and most preferably less than 10 kPa. Generally, the temperature is between 90° C. and 210° C. Preferably, the temperature is between 100° C. and 200° C., and more preferably between 110 SC and 180° C. These temperatures refer to the temperature in the bottom of the distillation column in which the distillation is performed.

The distillation includes the separation of low-boiling organic impurities (having a lower boiling point than epsilon-caprolactam) from epsilon-caprolactam and/or separating organic high-boiling impurities (having a higher boiling point than epsilon-caprolactam) from epsilon-caprolactam. The distillation preferably includes, in a first step, the separating out of low-boiling impurities from epsilon-caprolactam as a top product and the production of epsilon-caprolactam containing high-boiling impurities as a bottom product. In a second step, high purity epsilon-caprolactam is separated out as a top product and a distillation residue comprising epsilon-caprolactam and high boiling impurities is obtained as a bottom product.

In a preferred embodiment, prior to the distillative removal in step d)(iii), alkali metal hydroxide, preferably NaOH, is added to the aqueous phase comprising water, epsilon-caprolactam and impurities with lower- or higher-boiling points than epsilon-caprolactam. Preferably, the amount of NaOH that is added ranges from 0.5 to 100 mmol, more preferably and most preferably from 2 to 80 mmol per kg epsilon-caprolactam. Experiments have shown that the addition of an alkali metal hydroxide, in particular NaOH, allows for a particular effective distillative removal of impurities with lower and higher boiling points than epsilon-caprolactam.

In another preferred embodiment, prior to the distillative removal in step d)(iii), an oxidant, e.g., potassium permanganate, sodium permanganate, and/or hydrogen peroxide, is added to the aqueous phase comprising water, epsilon-caprolactam and impurities with lower- or higher-boiling points than epsilon-caprolactam. Most preferably, potassium permanganate is used as oxidant.

The oxidant can be added as solid or as a slurry or in the form of an aqueous solution to the aqueous phase comprising water, epsilon-caprolactam and impurities with lower- or higher-boiling points than epsilon-caprolactam, so that a dilute aqueous solution is obtained. The skilled person can determine by routine experimentation the amount of oxidant necessary for efficient oxidation of the aqueous phase comprising water, epsilon-caprolactam and impurities with lower- or higher-boiling points than epsilon-caprolactam. The exact amount of oxidant is, amongst others, very much dependent on the composition of the material derived from polyamide 6 comprising wasted fishing nets that are used as feed in the process of the invention. Preferably, the amount of oxidant is between 0.01 and 5% by weight relative to the amount of epsilon-caprolactam dissolved in the to-be-oxidized aqueous phase.

The temperature used for oxidation of the aqueous solution in the process of the invention can vary. Preferably, oxidation of the aqueous solution comprising water, epsilon-caprolactam and impurities with lower- or higher-boiling points than epsilon-caprolactam prior to the distillative removal in step d)(iii) with an oxidant is performed at a temperature ranging from 20° C. to 85° C., more preferably ranging from 30° C. to 80° C., wherein the oxidant is selected from the group consisting of potassium permanganate, sodium permanganate and hydrogen peroxide and combinations thereof, in particular potassium permanganate.

The length of time used for oxidation with an oxidant can vary. Preferably, oxidation of the aqueous solution comprising water, epsilon-caprolactam and impurities with lower- or higher-boiling points than epsilon-caprolactam with an oxidant is performed for 1 minute to 24 hours, more preferably for 2 minutes to 6 hours, and most preferably for 5 minutes to 2 hours.

The concentration of epsilon-caprolactam in the aqueous phase comprising water, epsilon-caprolactam and impurities with lower- or higher-boiling points than epsilon-caprolactam used for oxidation with an oxidant can vary. Preferably, the aqueous solution used for oxidation comprises a weight to weight ratio of epsilon-caprolactam to water from 5:1 to 1:5, more preferably from 3:1 to 1:3 and most preferably from 2:1 to 1:2. Optionally, prior to the addition of the oxidant to the aqueous phase the weight to weight ratio of epsilon-caprolactam to water is adapted. Preferably, the weight to weight ratio of epsilon-caprolactam to water is adapted by either addition of water or by removal of water.

In case potassium permanganate or sodium permanganate is used as oxidant, solid manganese(IV) oxide ($MnO_2$) particles are formed as reaction product. The skilled person can determine by routine experimentation the optimal solid-liquid filtration procedure for efficient removal of solid manganese(IV) oxide particles from the aqueous phase after oxidation. The usage of filter aids, like activated carbon or kieselguhr particles, to improve the filtration procedure are in this regard common practice.

The high purity epsilon-caprolactam obtained according to the process of the invention can be used to make polyamide 6 using processes well-known to the skilled person. This polyamide 6 may then be used in all known materials, including engineering materials, fibers and films. This polyamide 6 that is produced from material derived from polyamide 6 comprising fishing nets is especially suitable for high speed spinning applications, including garments containing spandex (also known as elastane).

The Plant

The invention also provides a plant, i.e., a chemical plant, comprising a depolymerization section [B], a recovery section [C], and a purification section [D], which is configured to carry out the above-described process of the invention. All plant features specifically described in connection with the plant below also correspond to specific embodiments of the process of the invention and vice versa. Thus, the plant is suitable for carrying out the process of the invention and it is to be understood that what has been described in connection with the process of the invention equally applies to the plant embodiments.

The plant can be a laboratory setup as in the examples. Preferably, however, the plant is an industrial scale plant. "Industrial scale" means that the plant has a production capacity for epsilon-caprolactam (i.e., is in principle capable of producing the same in an amount of) of at least 500 tons per year if operated all the time.

The plant of the invention is suitable for the production of purified epsilon-caprolactam from polyamide 6 comprising fishing nets and comprises at least the following three sections: a depolymerization section [B], a recovery section [C], and a purification section [D]. These sections, and thereby the plant, is configured to carry out the process of the invention described above.

In addition, the plant of the invention can comprise a pre-treatment section [A], which can comprise a mechanical size reduction section [β] to fragment the polyamide 6 comprising fishing nets into pieces and/or a cleaning section [α] to wash the polyamide 6 comprising fishing nets and/or a densification section [γ] to increase the bulk density of the nylon 6 comprising fishing nets. Cleaning includes both washing and separation of foreign materials from the polyamide 6 comprising fishing nets. The separation of foreign materials can be done both manually (handpicking) and mechanically (e.g., density separation, and magnetic separation). Both manual and mechanical devices, like brushes, can help in the washing process in cleaning section [α]. The washing is preferably carried out by an additional effect of friction. Different types of industrial washing systems are available on the market, like high speed friction washers. The mechanical size reduction section [β] comprises equipment for the mechanical fragmentation of the polyamide 6 comprising fishing nets into pieces. Non-limiting examples of this fragmentation equipment are a cutter, a shredder, a mill, a grinder, and a chipper. The densification section [γ] comprises equipment for the densification of material comprising nylon 6 comprising fishing nets. Densification to obtain material with a higher bulk density can be done by several technologies known to those skilled in the art. Well known examples of densification equipment include electric and hydraulic compactor machines and press machines, and equipment in which the feed is first melted and afterwards solidified by cooling, such as e.g., single screw and double screw extruders.

The depolymerization section [B] comprises one or more depolymerization reactors that are operated in series and/or in parallel. The polyamide 6 comprising fishing nets are fed to the reactor as a solid or as a melt, preferably as a melt. This feeding may be achieved by using an extruder, gear pump, or other means known in the art.

During production, a depolymerization reactor is at least partially filled with polyamide 6-containing feed stock, residual material, epsilon-caprolactam (and optionally catalyst). The depolymerization reactor can have any desirable form. Preferred reactor types are stirred and non-stirred bubble column reactors, stirred reactors and extruder type reactors.

The depolymerization reactor must be equipped with facilities for feeding of the material derived from polyamide 6 comprising fishing nets, and optionally the superheated steam and the catalyst. In addition, the depolymerization reactor is equipped with facilities for discharging the stream comprising epsilon-caprolactam, and the residual material.

Good contact between the steam and the reactor content is essential for an effective operation. Such contact can be achieved by various means known to the skilled person. As an example, steam can be sparged through the material using a multiplicity of inlets, e.g., using a steam distributor. Even further improved contact can be achieved by including mechanical agitation in the reactor, for example, using a combination of rotating paddles and static fins.

Preferably, depolymerization will be complete in 0.5 to 6 hours.

If superheated steam at high temperatures is not available on a production site, it must be made on-purpose by superheating of available steam from a boiler in a so-called superheater.

The recovery section [C] can comprise one or more (preferably partial) condensers to which a epsilon-caprolactam comprising stream in the form of a vapor stream comprising epsilon-caprolactam and water is charged. Such a (partial) condenser can have any desirable form. Preferably, a condenser is a distillation column from which a water-rich phase is obtained as top-product and crude epsilon-caprolactam as bottom product.

The purification section [D] comprises one or more pieces of extraction equipment, one or more pieces of solvent switch equipment, an oxidation section and one or more pieces of distillation equipment, to which the crude epsilon-caprolactam is charged and high purity epsilon-caprolactam is discharged.

To the extraction equipment crude epsilon-caprolactam and the organic solvent are charged and an organic phase comprising the organic solvent, epsilon-caprolactam and impurities, and an aqueous phase comprising water and impurities are discharged. The extraction equipment is selected from mixer-settler extractors, extraction columns, centrifugal extractors, and combinations thereof. Preferably, extraction equipment is a static or an agitated extraction column, like KARR® columns, SCHEIBEL® columns, rotating disc contactors (RDC), pulsed columns, sieve trays (static) columns, random packing (static) columns, and structured packing (SMVP) (static) columns.

To the solvent switch equipment water and an organic phase comprising the organic solvent, epsilon-caprolactam and impurities are charged and an organic solvent and an epsilon-caprolactam-water phase comprising water, epsilon-caprolactam, and impurities are discharged. The solvent switch equipment for processes based on back-extraction is selected from mixer-settler extractors, extraction columns, centrifugal extractors, and combinations thereof. Preferably, equipment for back-extraction is a static or an agitated extraction column, like KARR® columns, SCHEIBEL® columns, rotating disc contactors (RDC), pulsed columns, sieve trays (static) columns, random packing (static) columns, and structured packing (static) columns.

The solvent switch equipment for processes based on solvent swap distillation is selected from sieve trays distillation columns, random packing distillation columns, and structured packing distillation columns. Preferably, the distillation column is equipped with a reboiler, a condenser and equipment for reflux. The distillation column can be operated at atmospheric pressure, sub-atmospheric pressure or super-atmospheric pressure. Preferably, water is charged to the upper part of the distillation column and the aqueous phase comprising water, epsilon-caprolactam and impurities with lower- or higher-boiling points than epsilon-caprolactam is discharged from the lower part of the distillation column.

The oxidation section comprises one or more oxidation reactors that are operated in series and/or in parallel. An oxidant and the epsilon-caprolactam-water phase comprising water, epsilon-caprolactam and impurities are charged to the oxidation section. Usually, the oxidant is charged as solid or as a slurry or as an aqueous solution. In case potassium or sodium permanganate is applied as oxidant, the oxidation section also comprises a filtration section. The oxidation reactor can have any desirable form. Preferred reactor types are stirred and non-stirred reactors and packed column type reactors. The oxidation reactor must be equipped with facilities for feeding of the aqueous phase comprising water, epsilon-caprolactam and impurities with lower- or higher-boiling points than epsilon-caprolactam, and the oxidant. In addition, the oxidation reactor must be equipped with facilities for discharging the oxidized epsilon-caprolactam-water phase comprising water, epsilon-caprolactam and impurities, and optionally formed solid manganese(IV) oxide ($MnO_2$) particles. Preferably, the oxidation is performed at a temperature ranging from 20° C. to 85° C. and at atmospheric conditions.

The optionally present solid manganese(IV) oxide ($MnO_2$) particles can be removed by settling or by solid-liquid filtration, preferably by solid-liquid filtration. The usage of filter aids, like activated carbon particles or kieselguhr, to improve the filtration procedure are common practice. Filter systems suitable for the separation of solid manganese(IV) oxide particles are known to the skilled person. To such a filter system a suspension of the oxidized epsilon-caprolactam-water phase comprising the water, epsilon-caprolactam and impurities, and the solid manganese(IV) oxide particles are charged and the filtered oxidized epsilon-caprolactam-water phase comprising the water, epsilon-caprolactam and impurities is discharged. Generally, the solid manganese(IV) oxide particles are retained in the filter system. Preferably, such a filter system is operated in a semi-continuous mode, whereby the suspension and the filtered phase are continuously charged and continuously discharged, while the separated solids are collected in the filter system. From time to time, the charging of the suspension is interrupted and the collected solids are removed from the filter system.

To the distillation equipment the epsilon-caprolactam-water phase comprising water, epsilon-caprolactam and impurities are charged and high purity epsilon-caprolactam, water, and impurities (i.e., low-boiling organic impurities (having a lower boiling point than epsilon-caprolactam) and organic high-boiling impurities (having a higher boiling point than epsilon-caprolactam)) are discharged. The distillation equipment is selected from sieve trays distillation columns, random packing distillation columns, structured packing distillation columns, and horizontal and vertical (falling and climbing) film evaporators. Preferably, the distillation columns are equipped with a reboiler, a condenser, and equipment for reflux. The distillation equipment can be operated at atmospheric pressure, sub-atmospheric pressure or super-atmospheric pressure, preferably at sub-atmospheric pressure.

Preferably, the distillation includes the separation of water, low-boiling organic impurities (having a lower boiling point than epsilon-caprolactam) and/or organic high-boiling impurities (having a higher boiling point than epsilon-caprolactam) from epsilon-caprolactam. Preferably, the distillation includes, in a first step, the separating out of water as a top product and the production of epsilon-caprolactam containing low-boiling impurities and high-boiling impurities as a bottom product. In a second step, low-boiling impurities are separated out as top product and epsilon-caprolactam containing high-boiling impurities is obtained as a bottom product. In a third step, high purity epsilon-caprolactam is separated out as a top product and as a bottom product a distillation residue comprising epsilon-caprolactam and high boiling impurities is produced. Optionally, the first step and the second step are combined.

Preferably, prior to the distillative removal of water and impurities, alkali metal hydroxide, preferably NaOH, is added to the oxidized epsilon-caprolactam-water phase comprising water, epsilon-caprolactam and impurities. Preferably, the amount of NaOH that is added ranges from 0.5 to 100 mmol per kg epsilon-caprolactam, and more preferably from 2 to 80 mmol per kg epsilon-caprolactam. This leads to a particularly effective distillative removal of impurities with lower and higher boiling points than epsilon-caprolactam in the subsequent distillation.

The process of the invention can be operated in a continuous, semi-continuous or batch-wise fashion. Accordingly, also the plant of the invention can be configured to allow for one or more of these operating modes. In a preferred embodiment, the plant is configured to operate the process of the invention in a continuous or semi-continuous fashion. However, a discontinuous process is also possible. For example, the plant of the invention does not need to contain all sections described herein in one location. Optionally, the sections or parts thereof are located at two or more locations. In particular, the pre-treatment section [A] can be located at a first location, while the depolymerization section [B], the recovery section [C] and the purification section [D] are located at a second location. Similarly, also a mechanical size reduction section [β], as part of the pre-treatment section [A], can be located at a first location, while a cleaning section [α], as part of pre-treatment section [A] can be located at a second location, while the depolymerization section [B], the recovery section [C] and the purification section [D] are located at a third location. Optionally, the cleaning section [α] is split in two or more segments that are optionally all located at different locations. E.g., a first segment of cleaning section [α], as part of pre-treatment section [A] can be located at a first location, a mechanical size reduction section [β], as part of the pre-treatment section [A], can be located at a second location, while a second segment of cleaning section [α], as part of pre-treatment section [A] can be located at a third location, while the depolymerization section [B], the recovery section [C] and the purification section [D] are located at a fourth location. Densification section [γ] can be located at the same location as one or more other segments of the pre-treatment section [A] or can be located at the same location as depolymerization section [B].

The Product

The invention provides as new product epsilon-caprolactam obtained via depolymerization of polyamide 6 that is produced from material derived from polyamide 6 comprising fishing nets according to the process of the invention. This epsilon-caprolactam is advantageously characterized in particular by having a product carbon footprint of less than 2 kg $CO_2$ equivalent per kg purified epsilon-caprolactam (based on data originating from ecoinvent version 3.7.1; location: Europe). The epsilon-caprolactam obtained according to the invention may also be referred to as "purified epsilon-caprolactam". "Purified" as used herein means that the epsilon-caprolactam is produced from polyamide 6 comprising fishing nets according to the process of the invention, which results in it being obtained in purified form. In this sense, the epsilon-caprolactam is obtained and purified from material derived from polyamide 6 comprising fishing nets.

The process of the invention allows producing high-purity and therefore high-quality epsilon-caprolactam, which meets the specification for high demanding applications and at the same time the process is particularly economically friendly due to its lowered product carbon footprint and the use of waste as starting material. In preferred embodiments, the epsilon-caprolactam obtained by the process of the invention fulfils one or more of the following specifications, wherein the parameters and measurement methods are defined as in the Example section herein below:

| | |
|---|---|
| PAN: | max. 5 |
| E290: | max. 0.05 |
| VB: | max. 0.5 mmol/kg |
| Alkalinity: | max. 0.1 mmol/kg. |

The epsilon-caprolactam produced by the process of the invention is also particularly economical and environmentally friendly. This is evident from the much lower carbon footprint of the epsilon-caprolactam produced by the process of the invention as compared to classically produced epsilon-caprolactam (e.g., by Beckmann rearrangement of cyclohexanone oxime).

The environmental impact of a product is generally expressed as 'product carbon footprint'. The carbon footprint of a product is defined as the total emissions caused by the formation of that product, expressed as ton carbon dioxide equivalent per ton product. The carbon footprint of a product is amongst others depending on the feed stock, auxiliary materials, energy consumption, energy sources, production process and process efficiencies. Quantification of the carbon footprint of a product can be done as described in, e.g., the European Standard EN ISO 14040:2006 ("Environmental management—Life cycle assessment—Principles and framework").

Product carbon footprint calculations can be done both in-house or by external (preferably) certified organizations. These organizations verify and certify the product carbon footprint calculations based on e.g., LCA standard ISO 14040.

J. Hong and X. Xu ("Environmental impact assessment of caprolactam production—a case study in China"; J. of Cleaner production 27 (2012) 103-108; DOI: 10.1016/ r.jclepro.2011.12.037) reported that the potential impact of "virgin" epsilon-caprolactam obtained via Beckmann rearrangement of cyclohexanone oxime on global warming is 7.5 ton $CO_2$ equivalent per ton epsilon-caprolactam (which is equal to 7.5 kg $CO_2$ equivalent per kg epsilon-caprolactam), in case coal-based electricity and steam generation are involved. If natural gas-based electricity and steam generation are involved, the potential impact of virgin epsilon-caprolactam on global warming of the epsilon-caprolactam production process will be reduced to 6.4 ton $CO_2$ equivalent per ton epsilon-caprolactam (which is equal to 6.4 kg $CO_2$ equivalent per kg epsilon-caprolactam).

The product carbon footprint of epsilon-caprolactam that is obtained according to the process of the invention is much lower than the one of de novo synthesized, or "virgin" epsilon-caprolactam. The product carbon footprint of the epsilon-caprolactam that is obtained in the process of the invention is less than 4 kg, more preferably less than 3 kg $CO_2$, and most preferably equal to or less than 2 kg $CO_2$ equivalent per kg epsilon-caprolactam (based on data originating from ecoinvent version 3.7.1; location: Europe).

BRIEF DESCRIPTION OF THE DRAWINGS

In the following, the invention is described with reference to the Figures, which depict certain embodiments of the invention. The invention, however, is as defined in the claims and as generally described herein. It should not be limited to the embodiments shown for illustrative purposes in the Figures below.

FIG. 2 illustrates two embodiments of the pre-treatment section [A], in which the polyamide 6 comprising fishing nets are cleaned in a cleaning section [α] by removal of foreign materials and by washing with a washing solvent and fragmented in a mechanical size reduction section [β] to obtain cleaned and fragmented pieces of polyamide 6 comprising fishing nets.

FIG. 3 illustrates two embodiments of the purification section [D], in which crude epsilon-caprolactam is purified to obtain high purity epsilon-caprolactam.

DETAILED DESCRIPTION OF THE DRAWINGS

Figure 1:
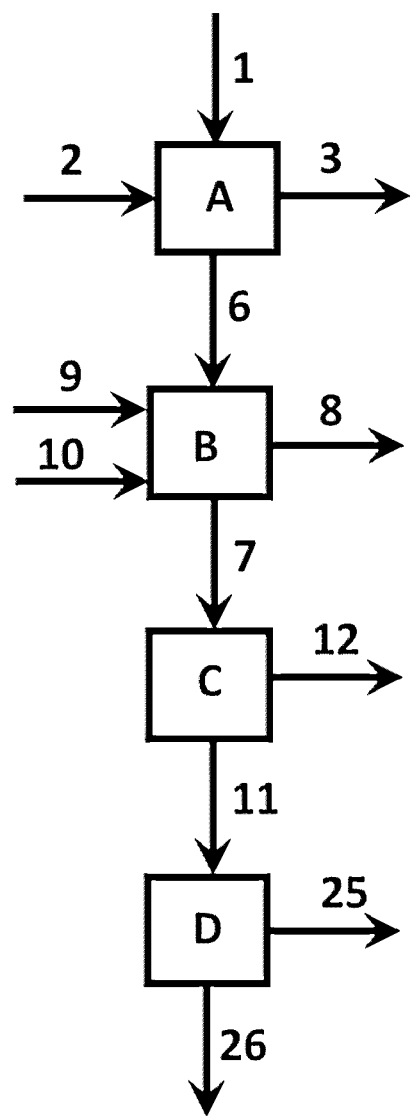
FIG. 1 is a schematic of the process of the invention comprising processing steps performed in an optional pre-treatment section [A], a depolymerization section [B], a recovery section [C] and a purification section [D].

The process of the invention is schematically illustrated in FIG. 1. The process is carried out in the following plant sections:

Optionally, the polyamide 6 comprising fishing nets [1] are cleaned by removal of foreign materials and by washing with a washing solvent [2] in pre-treatment section [A], whereby contaminated washing solvent [3] is obtained. Next, polyamide 6 comprising fishing nets are fragmented by mechanical size reduction. The cleaned and fragmented polyamide 6 comprising fishing nets [6] are discharged from the pre-treatment section [A]. Optionally, the polyamide 6 comprising fishing nets [1] are additionally cleaned by removal of foreign materials in the pre-treatment section [A]. Removal of foreign materials can be done prior and/or after fragmentation of the polyamide 6 comprising fishing nets. Optionally, the optionally cleaned and fragmented nylon 6 comprising fishing nets are densified before being depolymerized to epsilon-caprolactam in the depolymerization section [B](not shown in FIG. 1).

The optionally cleaned and fragmented polyamide 6 comprising fishing nets [6] are depolymerized to epsilon-caprolactam in the depolymerization section [B]. An epsilon-caprolactam comprising stream [7] is discharged from the depolymerization section [B]. In addition, residual material [8] is discharged. Optionally, superheated steam [9] and catalyst [10] are charged to the depolymerization section [B].

Crude epsilon-caprolactam [11] is recovered from the epsilon-caprolactam comprising stream [7] that is discharged from the depolymerization section [B] in recovery section [C]. In addition, an aqueous phase [12] is discharged from the recovery section [C] in case water or superheated steam [9] was charged to depolymerization section [B].

Crude epsilon-caprolactam [11] that is discharged from recovery section [C] is purified to yield high purity epsilon-caprolactam [26] in purification section [D]. Water and impurities [25] are also discharged from the purification section [D].

Figure 2A:
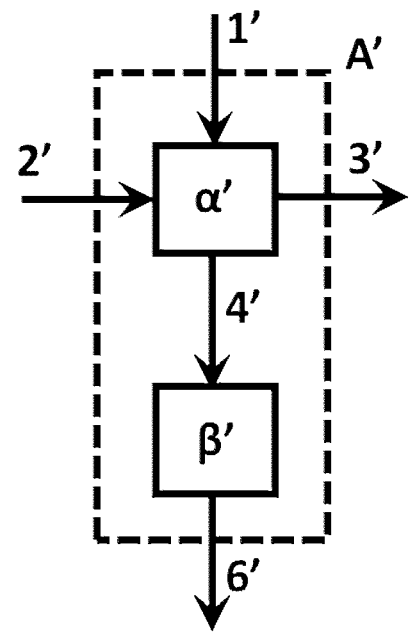
FIG. 2A depicts an embodiment of the pre-treatment section [A], in which polyamide 6 comprising fishing nets are first cleaned in a cleaning section [α] by removal of foreign materials and by washing with a washing solvent and then fragmented in a mechanical size reduction section [β] to obtain cleaned and fragmented pieces of polyamide 6 comprising fishing nets.

FIG. 2A depicts an embodiment of the pre-treatment section [A'] (area enclosed by dashed line), in which polyamide 6 comprising fishing nets [1'] are first cleaned in a cleaning section [α'] by removal of foreign materials and by washing with a washing solvent [2'] whereby foreign materials, contaminated washing solvent [3'] and cleaned polyamide 6 comprising fishing nets [4'] are obtained. Subsequently, the cleaned polyamide 6 comprising fishing nets [4'] are fragmented in a mechanical size reduction section [β'] to obtain cleaned and fragmented pieces of polyamide 6 comprising fishing nets [6']. The cleaned and fragmented pieces are then discharged.

Optionally, the cleaned and fragmented nylon 6 comprising fishing nets are densified before being depolymerized to epsilon-caprolactam in the depolymerization section [B] (not shown in FIG. 2A).

Figure 2B:
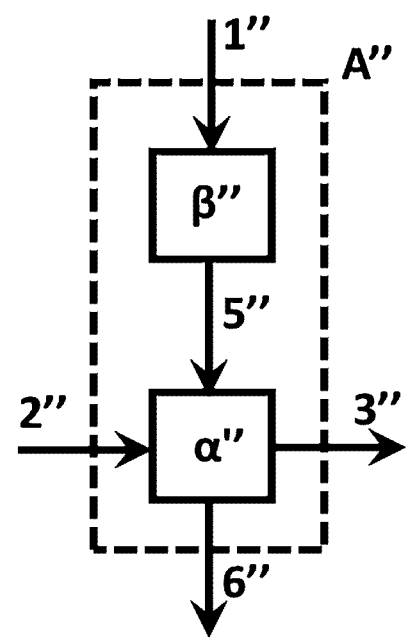
FIG. 2B depicts an embodiment of the pre-treatment section [A], in which polyamide 6 comprising fishing nets are first fragmented in a mechanical size reduction section [β] and then cleaned in a cleaning section [α] by removal of foreign materials and by washing with a solvent to obtain cleaned and fragmented pieces of polyamide 6 comprising fishing nets.

FIG. 2B depicts an embodiment of the pre-treatment section [A"] (area enclosed by dashed line), in which polyamide 6 comprising fishing nets [1"] are first fragmented in a mechanical size reduction section [β"] to obtain fragmented pieces of polyamide 6 comprising fishing nets [5"]. Subsequently, the fragmented pieces of polyamide 6 comprising fishing nets [5"] are cleaned in a cleaning section [α"] by removal of foreign materials and by washing with a washing solvent [2"] to obtain foreign materials, contaminated washing solvent [3"], and cleaned and fragmented pieces of polyamide 6 comprising fishing nets [6"] that are discharged. Optionally, the cleaned and fragmented nylon 6 comprising fishing nets are densified before being depolymerized to epsilon-caprolactam in the depolymerization section [B](not shown in FIG. 2B).

Figure 3A:
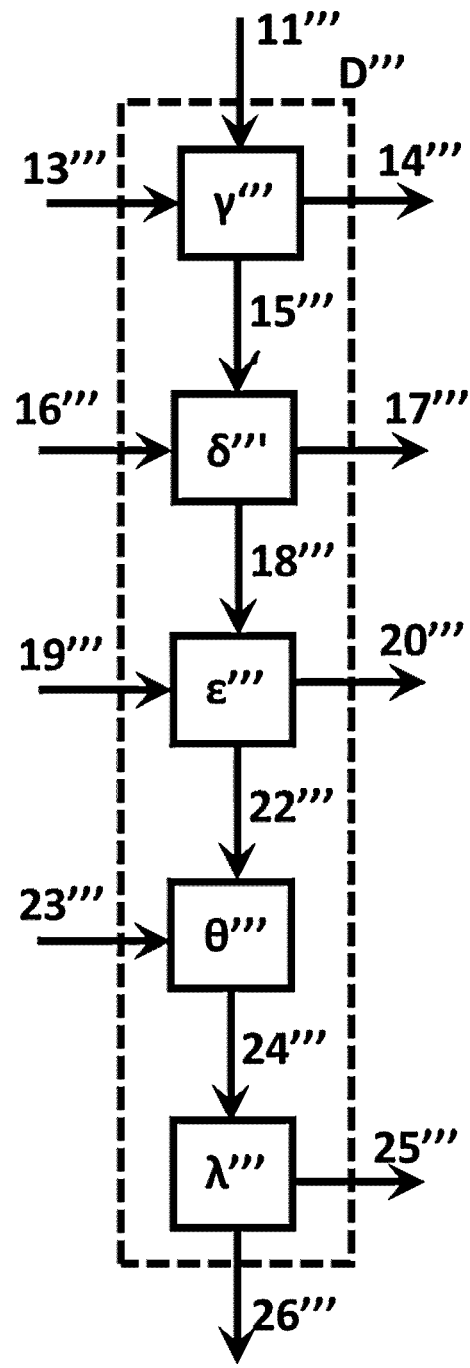
FIG. 3A depicts an embodiment of the purification section [D] of the process of the invention, that comprises an extraction section [γ], optionally a washing section [δ], a back-extraction section [ε], optionally an oxidation section [θ], and a distillation section [λ].

FIG. 3A depicts an embodiment of the purification section [D'"](area enclosed by dashed line), that comprises the following sections:

In the extraction section [γ'"], crude epsilon-caprolactam [11'"] is extracted with an organic solvent [13'"] to obtain an aqueous phase comprising water and impurities [14'"] and an organic phase comprising the organic solvent, epsilon-caprolactam and impurities [15'"]. Both phases are discharged from the extraction section [γ'"].

In the optional washing section [δ'"], the organic phase comprising the organic solvent, epsilon-caprolactam and impurities [15'"] is washed with water or an aqueous alkaline solution [16'"] to obtain an aqueous residue-comprising phase [17'"] and a washed organic phase that comprises organic solvent, epsilon-caprolactam and impurities [18'"]. Both phases are discharged from the washing section [6'"].

In the back-extraction section [ε'"], the optionally washed organic phase that comprises the organic solvent, epsilon-caprolactam and impurities [18'"] is back-extracted with water [19'"] to obtain an organic solvent phase that comprises impurities [20'"] and an aqueous phase comprising water, epsilon-caprolactam and impurities with lower- or higher-boiling points than epsilon-caprolactam [22'"]. Both phases are discharged from the back-extraction [ε'"]. Optionally, residual organic solvent is removed by stripping and/or distillation from the aqueous phase comprising water, epsilon-caprolactam and impurities with lower- or higher-boiling points than epsilon-caprolactam [22'"] (not shown in FIG. 3A).

In the optional oxidation section [θ'"], the aqueous phase comprising water, epsilon-caprolactam and impurities with lower- or higher-boiling points than epsilon-caprolactam [22'"], from which optional residual organic solvent has been removed by stripping and/or distillation, is oxidized with an oxidant [23'"] to obtain an oxidized epsilon-caprolactam-water phase comprising water, epsilon-caprolactam, and impurities [24'"]. This phase is discharged from the oxidation section [θ'"]. Optionally, the oxidized epsilon-caprolactam-water phase comprising the water, epsilon-caprolactam and impurities [24"] is filtered to remove solid manganese(IV) oxide particles before being discharged from the oxidation section [θ'"](not shown in FIG. 3A).

In distillation section [λ'"], the optionally oxidized epsilon-caprolactam-water phase comprising water, epsilon-caprolactam and impurities [24'"] from which optionally solid manganese(IV) oxide particles have been removed by filtration, is distilled to obtain water and impurities [25'"] (i.e., mainly water, low-boiling organic impurities, and high-boiling organic impurities) and high purity epsilon-caprolactam [26'"]. All of the distillation products are discharged from the distillation section [A'"]. Optionally, prior to the distillation in distillation section [A'"], an alkali metal hydroxide is dosed to the optionally oxidized epsilon-caprolactam-water phase comprising water, epsilon-caprolactam and impurities [24""](not shown in FIG. 3A).

Figure 3B:
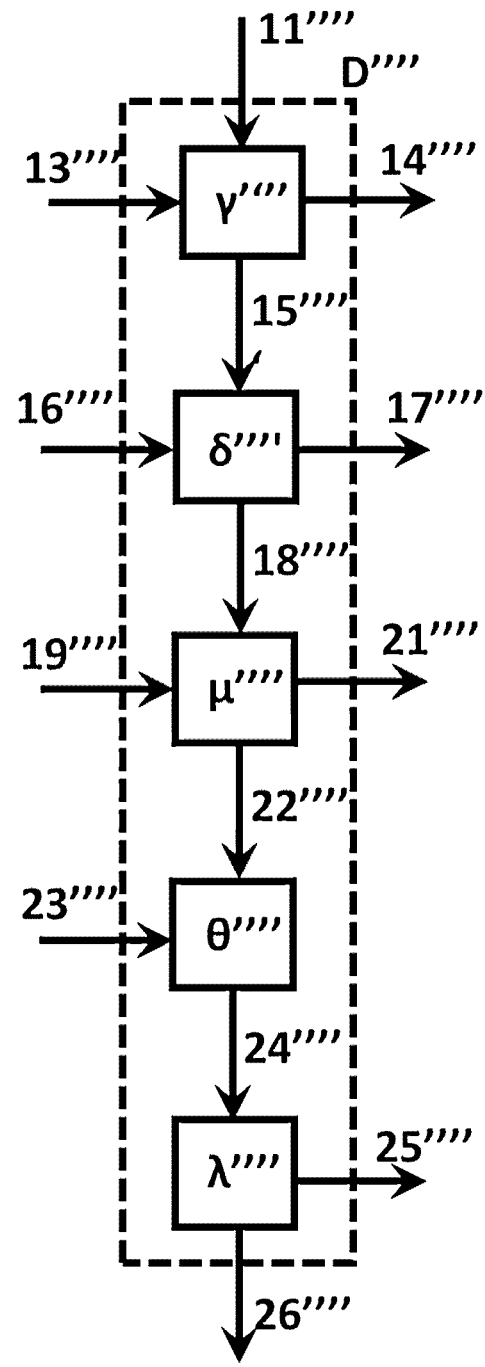
FIG. 3B depicts an embodiment of the purification section [D] of the process of the invention, that comprises an extraction section [γ], optionally a washing section [δ], a solvent swap distillation section [µ], optionally an oxidation section [θ], and a distillation section [λ].

FIG. 3B depicts an embodiment of the purification section [D""](area enclosed by dashed line) that comprises the following sections: In extraction section [γ""], crude epsilon-caprolactam [11""] is extracted with an organic solvent [13""] to obtain an aqueous phase comprising water and impurities [14""] and an organic phase comprising organic solvent, epsilon-caprolactam and impurities [15""]. Both phases are discharged from the extraction section [γ""].

In the optional washing section [δ""], the organic phase comprising the organic solvent, epsilon-caprolactam and impurities [15""] is washed with water or an aqueous alkaline solution [16""] to obtain an aqueous residue-comprising phase [17""] and a washed organic phase that comprises organic solvent, epsilon-caprolactam and impurities [18""]. Both phases are discharged from the washing section [δ""].

In the solvent swap distillation section [μ""], the optionally washed organic phase comprising the organic solvent, epsilon-caprolactam and impurities [18""] is solvent swap distilled with addition of water [19""] to obtain organic solvent [21""] and an aqueous phase comprising water, epsilon-caprolactam and impurities with lower- or higher-boiling points than epsilon-caprolactam [22""]. Both distillation products are discharged from the solvent swap distillation section [μ""].

In an optional oxidation section [θ""], the aqueous phase comprising water, epsilon-caprolactam and impurities with lower- or higher-boiling points than epsilon-caprolactam [22""], from which optionally residual organic solvent has been removed by stripping and/or distillation, is oxidized with an oxidant [23""] to obtain an oxidized epsilon-caprolactam-water phase comprising water, epsilon-caprolactam and impurities [24""]. This phase is discharged from the oxidation section [θ""]. Optionally, the oxidized epsilon-caprolactam-water phase comprising water, epsilon-caprolactam and impurities [24""] is filtered to remove solid manganese(IV) oxide particles before being discharged from the oxidation section [θ""](not shown in FIG. 3B).

In distillation section [ ""], the optionally oxidized epsilon-caprolactam-water phase comprising water, epsilon-caprolactam and impurities [24""] from which optionally solid manganese(IV) oxide particles have been removed by filtration, is distilled to obtain water and impurities [25""] (i.e., mainly water, low-boiling organic impurities, and high-boiling organic impurities) and high purity epsilon-caprolactam [26""]. All of the distillation products are discharged from the distillation section [λ""]. Optionally, prior to the distillation section [λ""], an alkali metal hydroxide is dosed to the optionally oxidized epsilon-caprolactam-water phase comprising water, epsilon-caprolactam and impurities [24""] that is charged to the distillation section [λ""] (not shown in FIG. 3B).

EXAMPLES

The following examples serve to explain the invention in more detail, in particular with regard to certain forms of the invention. The examples, however, are not intended to limit the present disclosure.

epsilon-caprolactam, that can be used for all major polyamide 6 polymerization applications, without dilution with purer qualities of epsilon-caprolactam, fulfils all of the following specifications:

| | |
|---|---|
| PAN: | max. 5 |
| E290: | max. 0.05 |
| VB: | max. 0.5 mmol/kg |
| Alkalinity: | max. 0.1 mmol/kg. |

The parameters and measurement methods are defined as follows:
PAN: ISO DIS 8660 Caprolactam for industrial use—Determination of permanganate index of caprolactam—Spectrometric method, revision of first edition ISO 8660; 1988,
E290: ISO 7059—Caprolactam for industrial use—determination of absorbance at a wavelength of 290 nm, 1982,
Volatile bases (VB) ISO 8661—Caprolactam for industrial use—Determination of volatile bases content—Titrimetric method after distillation, 1988.
Alkalinity of epsilon-caprolactam product: the alkalinity is determined by titration at a temperature of 25° C. using a Tashiro indicator in a 1:2 ratio of 0.1 wt./$v_{Ethanol}$% Methylene blue:0.1 wt./$v_{Ethanol}$% Methyl red, which is grey at its end point. A flask containing water and indicator is first titrated to grey, then X grams of an aqueous epsilon-caprolactam solution containing Y wt. % epsilon-caprolactam (as determined by refractive index) is added and the solution is titrated back to grey using a 0.01 N $H_2SO_4$ solution. Alkalinity is then given by:

Alkalinity (mmol/kg epsilon-caprolactam)=$v*t*1000/(X*Y)$

Where:
v=volume of $H_2SO_4$ solution added (ml)
t=normality of $H_2SO_4$ solution (=0.01 N)
X=weight of sample (g)
Y=concentration epsilon-caprolactam (wt. %)

The polyamide 6 comprising pellets that were used in the EXAMPLES and the COMPARATIVE EXPERIMENTS were made from discarded fishing nets. The pre-treatment included removal of foreign materials, washing, grinding, melting and conversion into chips/pellets. The pellets were obtained from a fishing net recycling company in China.

The pellets were rod-shaped and had an average diameter of about 3 mm and an average length of about 4 mm and the weight of most of the pellets was between 20 and 30 mg.

Thermal Gravimetric Analysis (TGA), combined with qualitative information from Differential Scanning Calorimetry (DSC), revealed that the polyamide 6 content of the pellets was >98 wt. % (on dry basis).

Example 1

Depolymerization of Polyamide 6 and Recovery of Epsilon-Caprolactam 48 grams of polyamide 6 comprising chips/pellets and 14 grams of 20 wt. % phosphoric acid were charged to a Premex high pressure autoclave. First, the reactor content was heated under nitrogen and subsequently superheated steam was injected continuously at a rate of 4 grams per minute during the 120-minute reaction. The temperature and the pressure in the reactor were maintained at 260° C. and 0.11 MPa, respectively. During the reaction, a vapor stream was continuously discharged from the reactor and was cooled down to ca. 20° C., whereby an epsilon-caprolactam and water comprising condensate was obtained.

The condensate that was composed of circa 44 grams of epsilon-caprolactam, most of the remainder being water, was concentrated by evaporation in a rotavap (rotary evaporator) that was operated under vacuum (9.5 kPa; water bath temperature was ca. 65° C.) to an epsilon-caprolactam concentration of 49.7 wt. %. (This mixture, crude epsilon-caprolactam, is the mixture to be purified.) The specifications of the crude epsilon-caprolactam were:

| | |
|---|---|
| PAN: | 16 |
| E290: | 2.33 |

This EXAMPLE shows that crude epsilon-caprolactam can be obtained by depolymerization of polyamide 6 that originates from discarded polyamide 6 comprising fishing nets. Due to the very poor quality, this crude epsilon-caprolactam cannot be used as-such for all major polyamide 6 polymerization applications.

Comparative Experiment 1

Depolymerization of Polyamide 6, Recovery of Epsilon-Caprolactam and Distillative Purification The procedure of EXAMPLE 1 was followed. Subsequently, 75 mmol of aqueous sodium hydroxide per kg epsilon-caprolactam was added. Then, water and impurities with lower boiling points than epsilon-caprolactam were removed as top products by distillation under reduced pressure in a batch-wise operated distillation set-up, whereby the pressure was stepwise reduced. epsilon-caprolactam was distilled at 300 Pa, while the impurities with higher boiling points compared to epsilon-caprolactam remained as bottom product in the distillation set-up. The specifications of the distilled epsilon-caprolactam were:

| | |
|---|---|
| PAN: | 5 |
| E290: | 0.09 |
| VB: | 0.34 mmol/kg |
| Alkalinity: | 0.25 mmol/kg. |

This COMPARATIVE EXPERIMENT shows that the quality of epsilon-caprolactam that is obtained from depolymerization of polyamide 6 that originates from discarded polyamide 6 comprising fishing nets and was purified by distillation is very poor as it does not meet most of the required specifications for major polymerization applications.

Comparative Experiment 2

Depolymerization of Polyamide 6, Recovery of Epsilon-Caprolactam and Purification by Oxidation The procedure of EXAMPLE 1 was followed. Subsequently, the crude epsilon-caprolactam was treated with 0.2 wt. % KMnO$_4$ with regard to epsilon-caprolactam at 50° C. for 2 hours. The solids formed were then removed from the oxidized reaction product by means of a filtration. The specifications of the purified epsilon-caprolactam were:

| | |
|---|---|
| PAN: | 30 |
| E290: | 3.62 |

This COMPARATIVE EXPERIMENT shows that the quality of epsilon-caprolactam that is obtained from depolymerization of polyamide 6 that originates from discarded polyamide 6 comprising fishing nets and was purified by oxidation is very poor and cannot be used as-such for all major polyamide 6 polymerization applications.

Comparative Experiment 3

Prepolymerization of Polyamide 6, Recovery of Epsilon-Caprolactam and Purification by Oxidation and Distillation The aqueous epsilon-caprolactam solution which was purified by oxidation that was obtained in COMPARATIVE EXPERIMENT 2 was then, after addition of 75 mmol of aqueous sodium hydroxide per kg epsilon-caprolactam, distilled according to the procedure described in COMPARATIVE EXPERIMENT 1. The specifications of the obtained purified epsilon-caprolactam were:

| | |
|---|---|
| PAN: | 3 |
| E290: | 0.09 |
| VB: | 0.84 mmol/kg |
| Alkalinity: | 0.35 mmol/kg. |

This COMPARATIVE EXPERIMENT shows that the quality of epsilon-caprolactam that is obtained from depolymerization of polyamide 6 that originates from discarded polyamide 6 comprising fishing nets and was purified by oxidation and distillation is poor and cannot be used as-such for all major polyamide 6 polymerization applications.

Comparative Experiment 4

Depolymerization of Polyamide 6, Recovery of Epsilon-Caprolactam and Purification by Oxidation, Carbon Treatment and Distillation The procedure of EXAMPLE 1 was followed. Subsequently, the crude epsilon-caprolactam was treated with 0.2 wt. % KMnO$_4$ with regard to epsilon-caprolactam at 50° C. for 2 hours. Then, the resulting oxidized solution was treated with 0.4 wt. % powdered activated carbon at 50° C. for 0.5 hours. Afterwards, the solids formed and the activated carbon particles were removed from the aqueous epsilon-caprolactam solution by means of a filtration. This activated carbon treated aqueous epsilon-caprolactam solution was then, after addition of 75 mmol of aqueous sodium hydroxide per kg epsilon-caprolactam, distilled according to the procedure described in COMPARATIVE EXPERIMENT 1. The specifications of the obtained purified epsilon-caprolactam were:

| | |
|---|---|
| PAN: | 3 |
| E290: | 0.08 |
| VB: | 0.43 mmol/kg |
| Alkalinity: | 0.29 mmol/kg. |

This COMPARATIVE EXPERIMENT shows that the quality of epsilon-caprolactam that is obtained from depolymerization of polyamide 6 that originates from discarded polyamide 6 comprising fishing nets and was purified by oxidation, carbon treatment and distillation is poor and cannot be used as-such for al major polyamide 6 polymerization applications.

Example 2

Depolymerization of Polyamide 6, Recovery of Epsilon-Caprolactam and Purification by Extraction, Back-Extraction, Oxidation and Distillation The procedure of EXAMPLE 1 was followed. The condensate that was composed of 44.5 grams of epsilon-caprolactam, most of the remainder being water, was concentrated by evaporation in a rotavap that was operated under vacuum (9.5 kPa; water bath temperature was ca. 65° C.) to an epsilon-caprolactam concentration of 50.2 wt. %. (This mixture, crude epsilon-caprolactam, Is the mixture to be purified.)

The crude epsilon-caprolactam was ten times batch-wise extracted with a solvent mixture of 4-methyl-2-pentanol (50 wt. %)/cyclohexane (50 wt. %) at a temperature of ca. 25° C. Total amount of extraction solvent used was 8.05 grams of 4 methyl-2-pentanol/cyclohexane per gram of crude epsilon-caprolactam. The combined organic extracts were batch-wise washed with 7 grams of an aqueous 2 wt. % NaOH solution. The resulting washed organic extracts were concentrated by distillation under vacuum conditions to an epsilon-caprolactam concentration of about 40 wt. % and then fresh cyclohexane was added. The epsilon-caprolactam concentration of the resulting mixture was about 27 wt. % and the weight ratio of the solvent mixture 4-methyl-2-pentanol/cyclohexane was 50 wt. %:50 wt. %. This mixture was 7 times batch-wise extracted with water at a temperature of ca. 25° C. Total amount of water used was 5.75 grams of water/gram of recovered epsilon-caprolactam.

The then obtained aqueous epsilon-caprolactam solution was concentrated by evaporation in a rotavap that was operated under vacuum (9.5 kPa; water bath temperature was ca. 65° C.) to an epsilon-caprolactam concentration of 45.9 wt. %. The resulting mixture was treated with 0.04 wt. % $KMnO_4$ with regard to epsilon-caprolactam at 50° C. for 2 hours. The solids formed were then removed from the oxidized reaction product by means of a filtration. The epsilon-caprolactam in the obtained aqueous solution was after addition of 75 mmol of aqueous sodium hydroxide per kg epsilon-caprolactam further purified by distillation as described in COMPARATIVE EXPERIMENT 1. The specifications of the obtained purified epsilon-caprolactam were:

| | |
|---|---|
| PAN: | 1.5 |
| E290: | 0.032 |
| VB: | 0.082 mmol/kg |
| Alkalinity: | 0.1 mmol/kg. |

From this EXPERIMENT, it can be concluded that purified epsilon-caprolactam that meets all the required specifications for major polymerization applications can be obtained from depolymerization of polyamide 6 that originates from discarded polyamide 6 comprising fishing nets and was purified by extraction, back-extraction, oxidation and distillation.

Example 3

Depolymerization of Polyamide 6, Recovery of Epsilon-Caprolactam and Purification by Extraction, Back-Extraction and Distillation The procedure of EXAMPLE 1 was followed.

The obtained aqueous epsilon-caprolactam solution was concentrated by evaporation in a rotavap that was operated under vacuum (9.5 kPa; water bath temperature was ca. 65° C.) to an epsilon-caprolactam concentration of 50.7 wt. %. (This mixture, crude epsilon-caprolactam, is the mixture to be purified.)

The crude epsilon-caprolactam was 11 times batch-wise extracted with toluene at a temperature of ca. 25° C. Total amount of extraction solvent used was 12.5 grams of toluene per gram of crude epsilon-caprolactam. The combined organic extracts were concentrated by distillation under vacuum conditions to an epsilon-caprolactam concentration of 30 wt. %. Subsequently, the resulting concentrated organic extracts were 4 times batch-wise extracted with water at a temperature of ca. 25° C. Total amount of water used was 1.79 grams of water/gram of combined organic extracts. The resulting combined aqueous epsilon-caprolactam solution was concentrated by evaporation In a rotavap that was operated under vacuum (9.5 kPa; water bath temperature was ca. 65° C.) to an epsilon-caprolactam concentration of 52.2 wt. %.

The epsilon-caprolactam in the obtained aqueous solution was after addition of 75 mmol of aqueous sodium hydroxide per kg epsilon-caprolactam further purified by distillation as described in COMPARATIVE EXPERIMENT 1. The specifications of the obtained purified epsilon-caprolactam were:

| | |
|---|---|
| PAN: | 4 |
| E290: | 0.04 |
| VB: | 0.2 mmol/kg |
| Alkalinity: | 0.1 mmol/kg. |

From this EXPERIMENT, it can be concluded that purified epsilon-caprolactam that meets all the required specifications for major polymerization applications can be obtained from depolymerization of polyamide 6 that originates from discarded polyamide 6 comprising fishing nets and was purified by extraction, back-extraction and distillation.

Example 4

Depolymerization of Polyamide 6, Recovery of Epsilon-Caprolactam and Purification by Extraction, Back-Extraction and Distillation The procedure of EXAMPLE 1 was followed twofold. Both obtained aqueous epsilon-caprolactam solutions were concentrated by evaporation in a rotavap that was operated under vacuum (9.5 kPa; water bath temperature was ca. 65° C.) to epsilon-caprolactam concentrations of 70.2 wt. % and 67.6 wt. %, respectively. Then, both concentrated aqueous epsilon-caprolactam solutions were added together. One third of the resulting mixture, crude epsilon-caprolactam, is used for further purification.

The crude epsilon-caprolactam was diluted to 65.0 wt. % and 5 times batch-wise extracted with benzene at a temperature of ca. 25° C. The total amount of extraction solvent used was 10.7 grams of benzene per gram of crude epsilon-caprolactam. The combined organic extracts were batch-wise washed with 3.1 grams of an aqueous 2 wt. % NaOH solution. The resulting washed organic extracts were concentrated by distillation under vacuum conditions to an epsilon-caprolactam concentration of about 17 wt. %. Subsequently, the resulting concentrated organic extracts were 4 times batch-wise extracted with water at a temperature of ca. 25° C. The total amount of water used was 1.19 grams of water/gram of concentrated combined organic extracts. The resulting combined aqueous epsilon-caprolactam solution was concentrated by evaporation in a rotavap that was operated under vacuum (9.5 kPa; water bath temperature was ca. 65° C.) to an epsilon-caprolactam concentration of 56.3 wt. %.

The epsilon-caprolactam in the obtained aqueous solution was after addition of 75 mmol of aqueous sodium hydroxide per kg epsilon-caprolactam further purified by distillation as described in COMPARATIVE EXPERIMENT 1. The specifications of the obtained purified epsilon-caprolactam were:

| PAN: | 3 |
|---|---|
| E290: | 0.01 |
| VB: | <0.02 mmol/kg |
| Alkalinity: | 0.1 mmol/kg. |

From this EXAMPLE, it can be concluded that purified epsilon-caprolactam that meets all the required specifications for major polymerization applications can be obtained from depolymerization of polyamide 6 that originates from discarded polyamide 6 comprising fishing nets and was purified by extraction, back-extraction and distillation.

Example 5

Calculation of Carbon Footprint of Purified Epsilon-Caprolactam

A continuous process according to the invention for the production of purified epsilon-caprolactam from polyamide 6 comprising fishing nets in a plant was simulated. The process included:
Mechanical removal of foreign materials from polyamide 6 comprising fishing nets;
Cutting polyamide 6 comprising fishing nets in small pieces;
Washing of the pieces of polyamide 6 comprising fishing nets with water;
Separation of washed pieces of polyamide 6 comprising fishing nets and aqueous extract by centrifugation;
Drying of washed pieces of polyamide 6 comprising fishing nets;
Melting and pelletization of washed pieces of polyamide 6 comprising fishing nets;
Depolymerization of polyamide 6 under influence of $H_3PO_4$ and superheated steam;
Recovery of crude epsilon-caprolactam (75 wt. % epsilon-caprolactam) by partial condensation of vapors discharged from depolymerization reactor;
Counter-current extraction of concentrated crude epsilon-caprolactam with toluene;
Washing of organic extract with diluted caustic solution;
Counter-current back-extraction of washed organic extract with water;
Evaporative concentration of aqueous extract;
Oxidation of concentrated aqueous extract with $KMnO_4$;
Addition of caustic; and
Recovery of pure epsilon-caprolactam by vacuum distillation.

The carbon footprint of purified epsilon-caprolactam was calculated based on the consumption figures of raw materials, and utilities of the above described process are based on data originating from ecoinvent version 3.7.1.

The outcome revealed that the product carbon footprint of purified epsilon-caprolactam obtained from polyamide 6 comprising fishing nets is less than 2.0 tons $CO_2$ eq./ton of epsilon-caprolactam (location Europe).

While the invention has been described and with reference to specific embodiments thereof, it will be apparent to those of ordinary skill in the art that various changes and modifications, including (semi-)continuous operations and upscaling to commercial scale, can be made therein without departing from the spirit and scope thereof.

The invention claimed is:

1. A process for recovering purified epsilon-caprolactam from material derived from polyamide 6 comprising fishing nets in a plant, wherein the plant comprises
    a depolymerization section [B],
    a recovery section [C], and
    a purification section [D],
and wherein the process comprises the steps of:
    a) charging material derived from polyamide 6 comprising fishing nets to the depolymerization section [B];
    b) depolymerizing the material derived from polyamide 6 comprising fishing nets in the depolymerization section [B] at a temperature ranging from 180° C. to 400° C. so that an epsilon-caprolactam comprising stream is obtained;
    c) discharging the epsilon-caprolactam comprising stream from the depolymerization section [B] and recovering crude epsilon-caprolactam from said stream in the recovery section [C]; and
    d) purifying said crude epsilon-caprolactam in the purification section [D] to obtain purified epsilon-caprolactam wherein the purification comprises the steps of
        (i) extracting the crude epsilon-caprolactam with an organic solvent, whereby an organic phase is obtained, and wherein the organic phase comprises the organic solvent, epsilon-caprolactam and impurities;
        (ii) switching the solvent by replacing the organic solvent at least partially with water, whereby an aqueous phase comprising water, epsilon-caprolactam and impurities with lower- or higher-boiling points than epsilon-caprolactam is obtained and wherein the solvent switch step (ii) is selected from a process based on back-extraction with water, and a process based on solvent swap distillation, in which the organic solvent is distilled off and water is charged; and
        (iii) obtaining purified epsilon-caprolactam by distillative removal of impurities with lower- or higher-boiling points than epsilon-caprolactam from said aqueous phase; and at least one additional step comprising:
    after step d)(i), the organic phase obtained in step d)(i) is washed with water or with an aqueous alkaline solution, and
    wherein prior to the distillative removal in step d)(iii), an alkali metal hydroxide, is added to the aqueous phase.

2. The process according to claim 1, wherein the depolymerization in step b) is performed in the presence of water, whereby the epsilon-caprolactam comprising stream is a vapor stream comprising epsilon-caprolactam and water in a weight to weight ratio of 1:2 to 1:15; and wherein in the extraction in step d(i) both an aqueous phase and an organic phase are obtained.

3. The process according to claim 1, wherein prior to the distillative removal in step d)(iii), the purification in step d) also comprises the step of
oxidizing with an oxidant in aqueous solution at a temperature ranging from 20° C. to 85° C., wherein the oxidant is selected from the group consisting of potassium permanganate, sodium permanganate and hydrogen peroxide and combinations thereof.

4. The process according to claim 2, wherein the water present in step b) is in the form of steam, which is charged to the depolymerization section [B] in step b) as superheated steam having a temperature ranging from 220° C. to 575° C.

5. The process according to claim 1, wherein the solvent switching in step d)(ii) is a process based on back-extraction with water.

6. The process according to claim 1, wherein the solvent switching in step d)(ii) is a process based on solvent swap distillation.

7. The process according to claim 3, wherein the organic solvent in step d)(i) is selected from the group consisting of cyclohexane, benzene, toluene, methylene chloride, chloroform, trichloroethane, 4 methyl-2-pentanol, 1-octanol, 2-ethylhexanol and mixtures thereof.

8. The process according to claim 3, wherein the oxidizing in step d) is performed in an aqueous solution comprising water and epsilon-caprolactam in a weight to weight ratio of 5:1 to 1:5.

9. The process according to claim 1, wherein the depolymerization in step b) is carried out in the absence or presence of a catalyst, wherein the catalyst is selected from an acid and a base catalyst, the acid catalyst being selected from the group consisting of orthophosphoric acid, boric acid, sulfuric acid, organic acid, organic sulfonic acid, salts of the aforementioned acids, $Al_2O_3$ and $SiO_2$, and combinations thereof, and the base catalyst being selected from the group consisting of alkali hydroxide, alkali salt, alkaline earth hydroxide and alkaline earth salts, organic bases and solid bases, and combinations thereof.

10. The process according to claim 1, wherein the depolymerization in step b) is carried out in the absence of a catalyst or in the presence of orthophosphoric acid.

11. The process according to claim 1, wherein prior to step a) the material derived from polyamide 6 comprising fishing nets is obtained as the product of a pre-treatment in a pre-treatment section [A], wherein the pre-treatment is selected from at least one of: a cleaning in cleaning section [α], a mechanical size reduction in a mechanical size reduction section [β] and increasing the bulk density in a densification section [γ].

12. The process of claim 1, wherein prior to the distillative removal in step d)(iii), the alkali metal hydroxide is NaOH.

13. The process of claim 3, wherein the oxidant is potassium permanganate.

14. The process of claim 4, wherein the superheated steam has a temperature ranging from 275° C. to 500° C.

* * * * *